United States Patent
Williams

(10) Patent No.: US 10,946,842 B2
(45) Date of Patent: Mar. 16, 2021

(54) MODULAR TRAILER SYSTEM

(71) Applicant: HALDEX BRAKE PRODUCTS CORPORATION, Kansas City, MO (US)

(72) Inventor: Justin Williams, Merriam, KS (US)

(73) Assignee: HALDEX BRAKE PRODUCTS CORPORATION, Kansas City, MO (US)

( * ) Notice: Subject to any disclaimer, the term of this patent is extended or adjusted under 35 U.S.C. 154(b) by 154 days.

(21) Appl. No.: 16/224,961

(22) Filed: Dec. 19, 2018

(65) Prior Publication Data

US 2019/0184950 A1    Jun. 20, 2019

Related U.S. Application Data

(60) Provisional application No. 62/608,229, filed on Dec. 20, 2017.

(51) Int. Cl.
*B60T 7/20* (2006.01)
*B60T 8/17* (2006.01)
(Continued)

(52) U.S. Cl.
CPC .............. *B60T 7/20* (2013.01); *B60T 8/1708* (2013.01); *B60T 13/662* (2013.01); *B60T 13/683* (2013.01); *B60T 17/22* (2013.01); *B60D 1/64* (2013.01); *B60L 2200/28* (2013.01); *B60R 2021/0104* (2013.01); *B60R 2021/01259* (2013.01); *B60T 2270/406* (2013.01)

(58) Field of Classification Search
CPC ... B60R 2021/0104; B60R 2021/01259; B60T 13/662; B60T 13/683; B60T 7/20; B60T 8/1708; B60T 2270/406; B60T 17/22; B60L 2200/28; B60D 1/64
USPC .......................................................... 701/70
See application file for complete search history.

(56) References Cited

U.S. PATENT DOCUMENTS

| | | | |
|---|---|---|---|
| 5,409,303 A * | 4/1995 | Engelbert ............. | B60T 8/1708 188/170 |
| 5,549,362 A * | 8/1996 | Broome .................... | B60T 8/00 303/123 |

(Continued)

OTHER PUBLICATIONS

Haldex, Technical Information—ITCM™ (Intelligent Trailer Control Module), 2 pages, L25125W US Feb. 2017, haldex.com.
(Continued)

*Primary Examiner* — Atul Trivedi
(74) *Attorney, Agent, or Firm* — Stinson LLP

(57) ABSTRACT

A trailer brake and monitoring system with a trailer control module, which has a processor, a signal input, a first wheel speed input, a second wheel speed input, a valve output, and a data port. The processor receives a signal from the signal input, and the processor sends the signal to the data port. The processor receives a first wheel speed signal from the first wheel speed input and a second wheel speed signal from the second wheel speed input. The processor is configured to send a first brake signal to the valve output based on at least one of the first wheel speed signal and the second wheel speed signal. The trailer control module may include third and fourth wheel speed inputs and a second valve output. The data port may be a power input configured for connection with a PLC cable and/or a CAN port.

22 Claims, 17 Drawing Sheets

(51) Int. Cl.
*B60T 13/68* (2006.01)
*B60T 13/66* (2006.01)
*B60T 17/22* (2006.01)
*B60R 21/01* (2006.01)
*B60D 1/64* (2006.01)

(56) References Cited

U.S. PATENT DOCUMENTS

| | | | |
|---|---|---|---|
| 5,722,740 A | 3/1998 | Engelbert | |
| 5,738,417 A * | 4/1998 | Wood | B60T 13/665 |
| | | | 303/15 |
| 8,108,118 B2 | 1/2012 | Greene | |
| 8,204,668 B2 | 6/2012 | Greene | |
| 8,511,929 B2 | 8/2013 | Raye | |
| 8,777,169 B2 | 7/2014 | Raye | |
| 9,016,807 B1 * | 4/2015 | Pieronek | B60T 8/1708 |
| | | | 303/123 |
| 9,168,900 B2 | 10/2015 | Greene | |
| 9,267,520 B2 | 2/2016 | Raye | |
| 9,415,759 B2 | 8/2016 | Greene | |
| 9,440,632 B2 | 9/2016 | Bennett | |
| 9,604,611 B2 | 3/2017 | Raye | |
| 2005/0029859 A1 * | 2/2005 | Bensch | B60T 13/68 |
| | | | 303/89 |
| 2005/0057088 A1 * | 3/2005 | Washington | B60T 8/176 |
| | | | 303/69 |
| 2009/0198427 A1 * | 8/2009 | Christopher Jackson | |
| | | | B60T 8/1708 |
| | | | 701/70 |
| 2010/0131167 A1 * | 5/2010 | Greene | B60T 17/22 |
| | | | 701/78 |
| 2011/0236128 A1 | 9/2011 | Raye | |
| 2012/0109470 A1 * | 5/2012 | Amtsfeld | B60T 13/683 |
| | | | 701/48 |
| 2012/0330502 A1 * | 12/2012 | Greene | B60T 17/22 |
| | | | 701/33.9 |
| 2013/0041576 A1 * | 2/2013 | Switkes | G08G 1/22 |
| | | | 701/123 |
| 2014/0048040 A1 * | 2/2014 | Rivet | F02D 9/02 |
| | | | 123/434 |
| 2015/0084402 A1 * | 3/2015 | Tober | B60T 8/885 |
| | | | 303/20 |
| 2015/0094906 A1 * | 4/2015 | Greene | B60T 13/263 |
| | | | 701/33.9 |
| 2016/0054735 A1 * | 2/2016 | Switkes | H04W 4/44 |
| | | | 701/23 |
| 2016/0121870 A1 * | 5/2016 | Bennett | B60T 8/176 |
| | | | 701/71 |
| 2016/0325627 A1 * | 11/2016 | Young | B60T 13/586 |
| 2016/0332610 A1 * | 11/2016 | Wolff | B60T 13/588 |
| 2019/0196501 A1 * | 6/2019 | Lesher | B60T 7/22 |
| 2019/0359196 A1 * | 11/2019 | Engelbert | B60C 23/20 |
| 2020/0040956 A1 * | 2/2020 | Cremona | B60T 17/22 |
| 2020/0062233 A1 * | 2/2020 | Yu | B60T 17/221 |
| 2020/0156604 A1 * | 5/2020 | Liu | B60L 15/36 |
| 2020/0226850 A1 * | 7/2020 | Bower | G07C 5/0825 |

OTHER PUBLICATIONS

Haldex, Installation/Service Manual—ITCM™ Intelligent Trailer Control Module (L31286), 48 pages, L31286W US Rev. Jun. 2017, haldex.com.

Haldex, Installation/Service Manual—Haldex Modular Trailer System (HMTS) with Brake Monitoring System (BMS) L31293W, 20 pages, L31293W US Jun. 2017, haldex.com.

Haldex, Installation/Service Manual—Brake Monitoring System (BMS) Auxiliary used with Intelligent Trailer Control Module (ITCM), 16 pages, L31290W US Jun. 2017, haldex.com.

Haldex, Installation/Service Guide—2S/1M-4S/2M PLC Select Anti-Lock Braking Systems (L30041), 48 pages, US Dec. 2016, haldex.com.

Haldex, Haldex PLC Select ABS Platform L20337, 6 pages, US Jul. 2014, haldex.com.

* cited by examiner

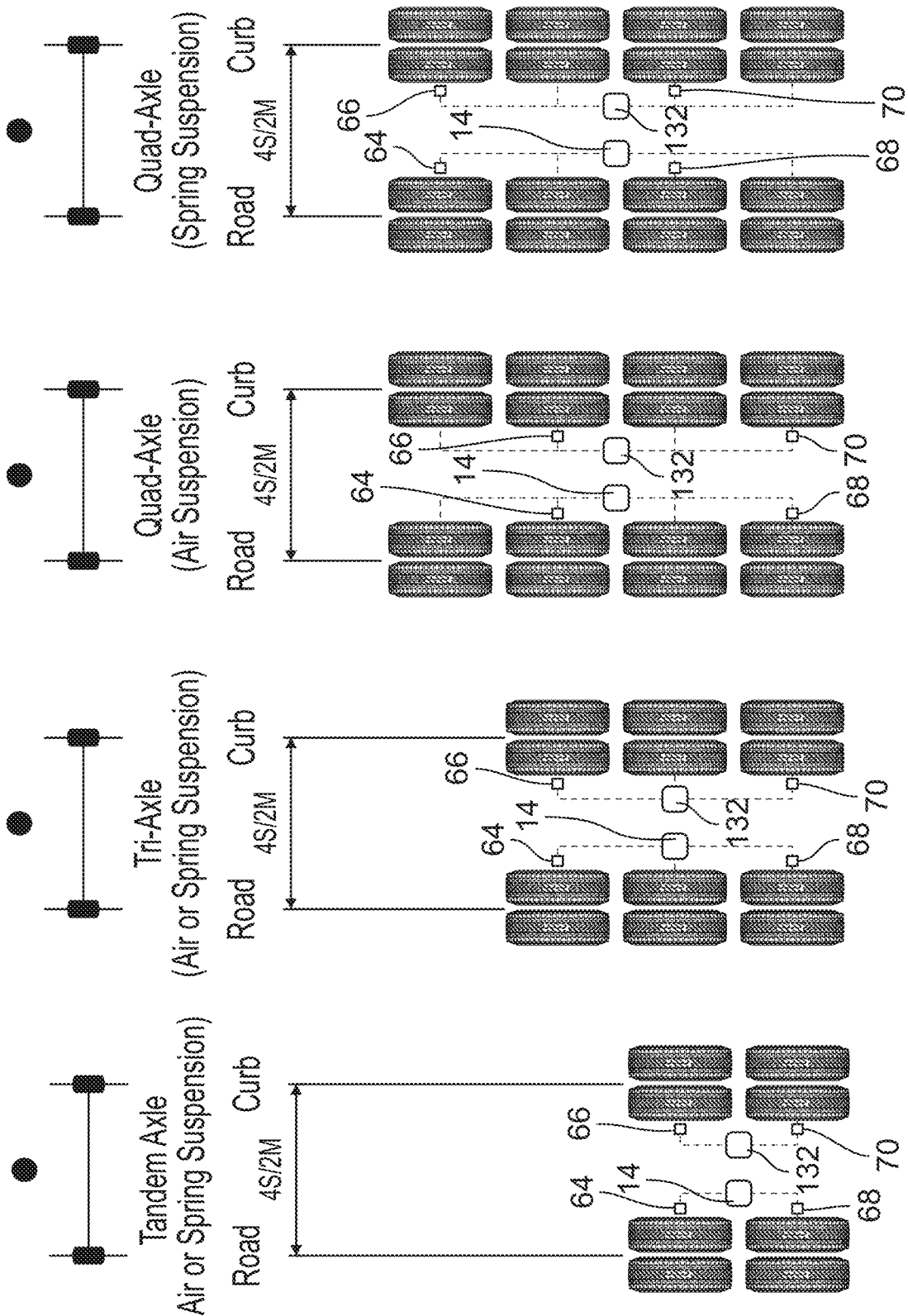

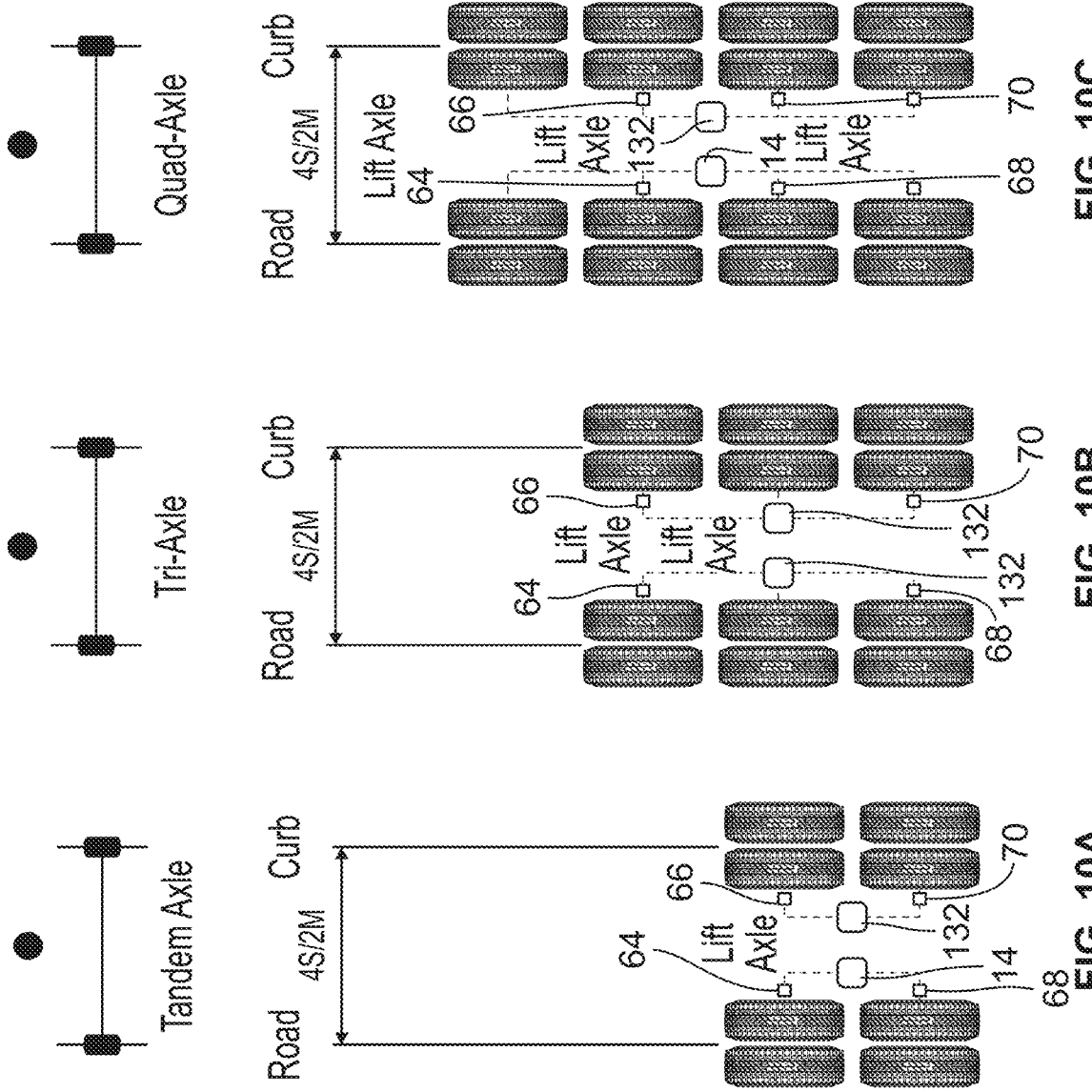

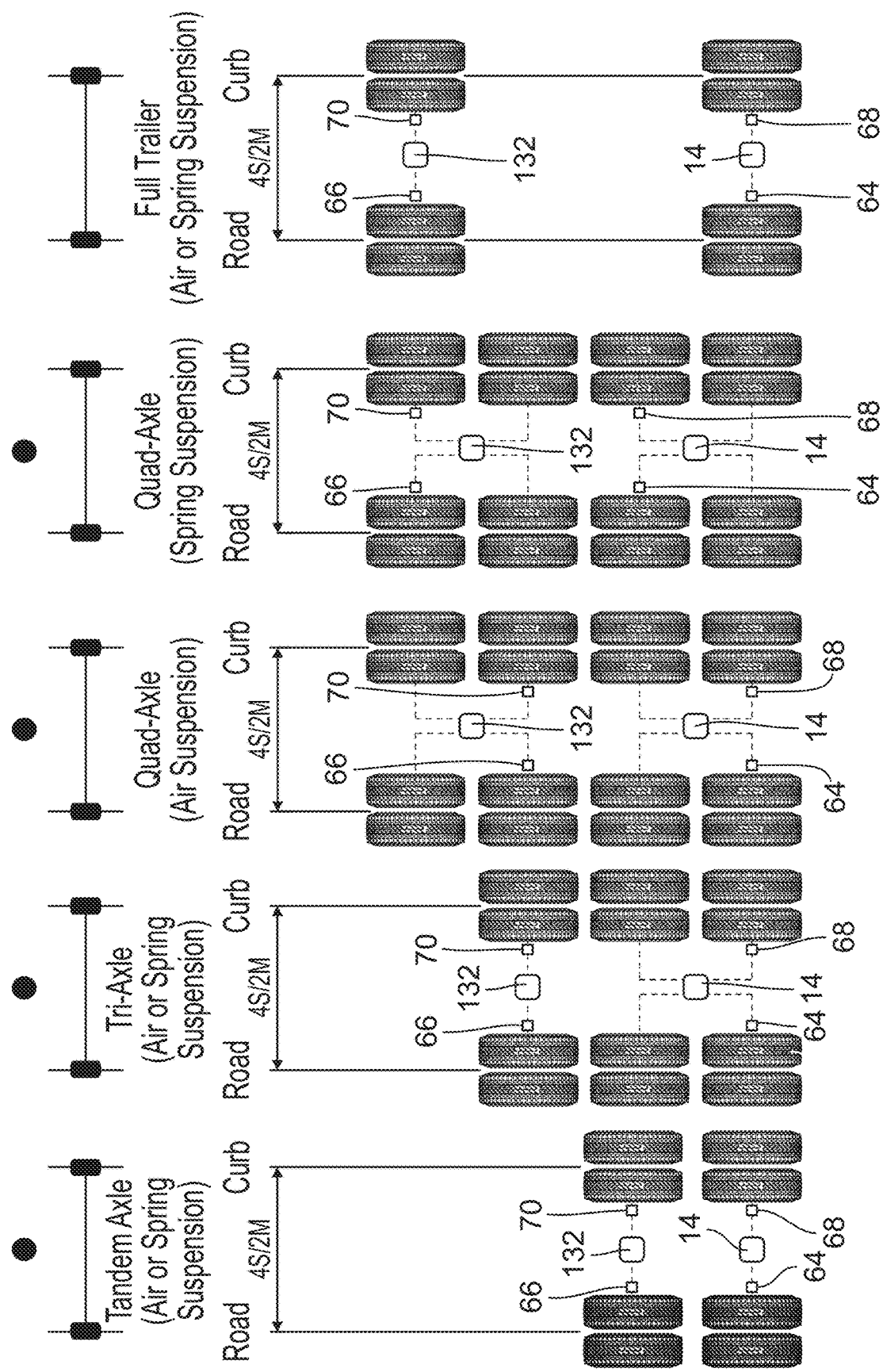

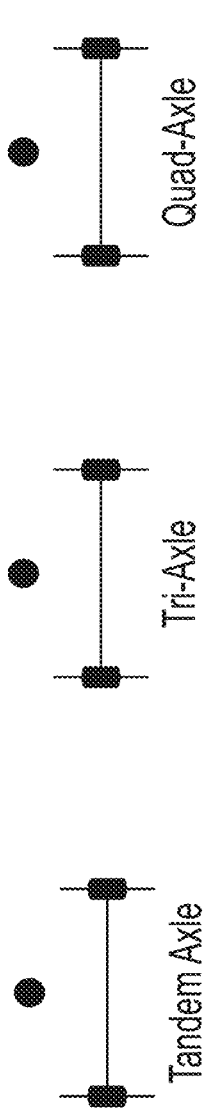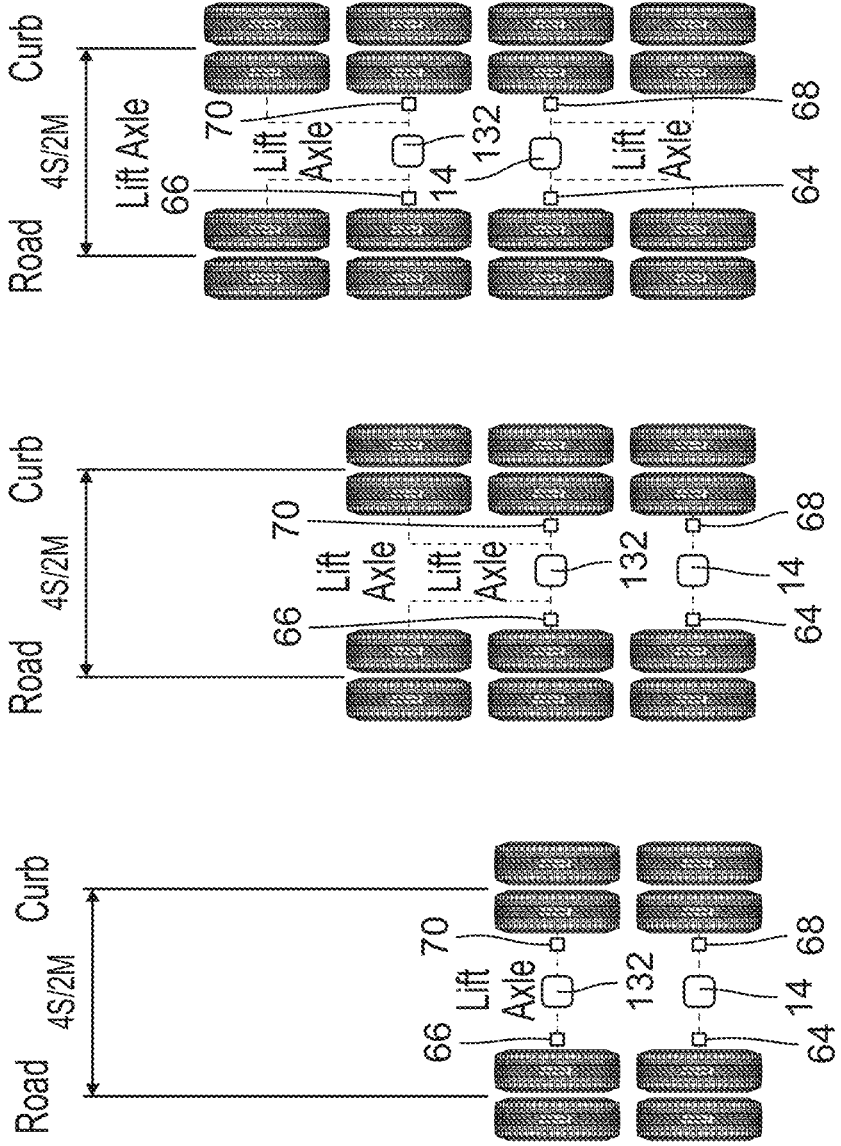

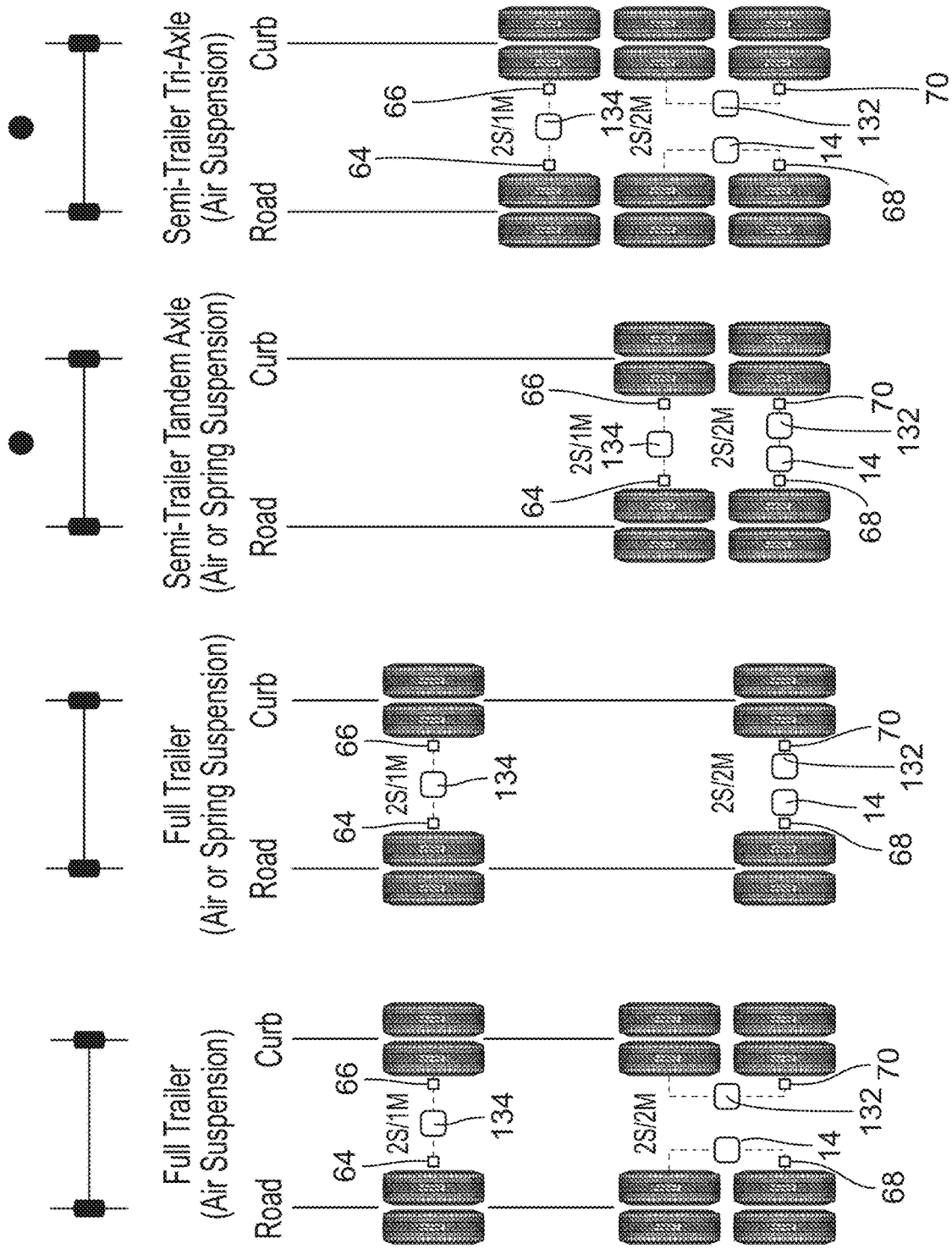

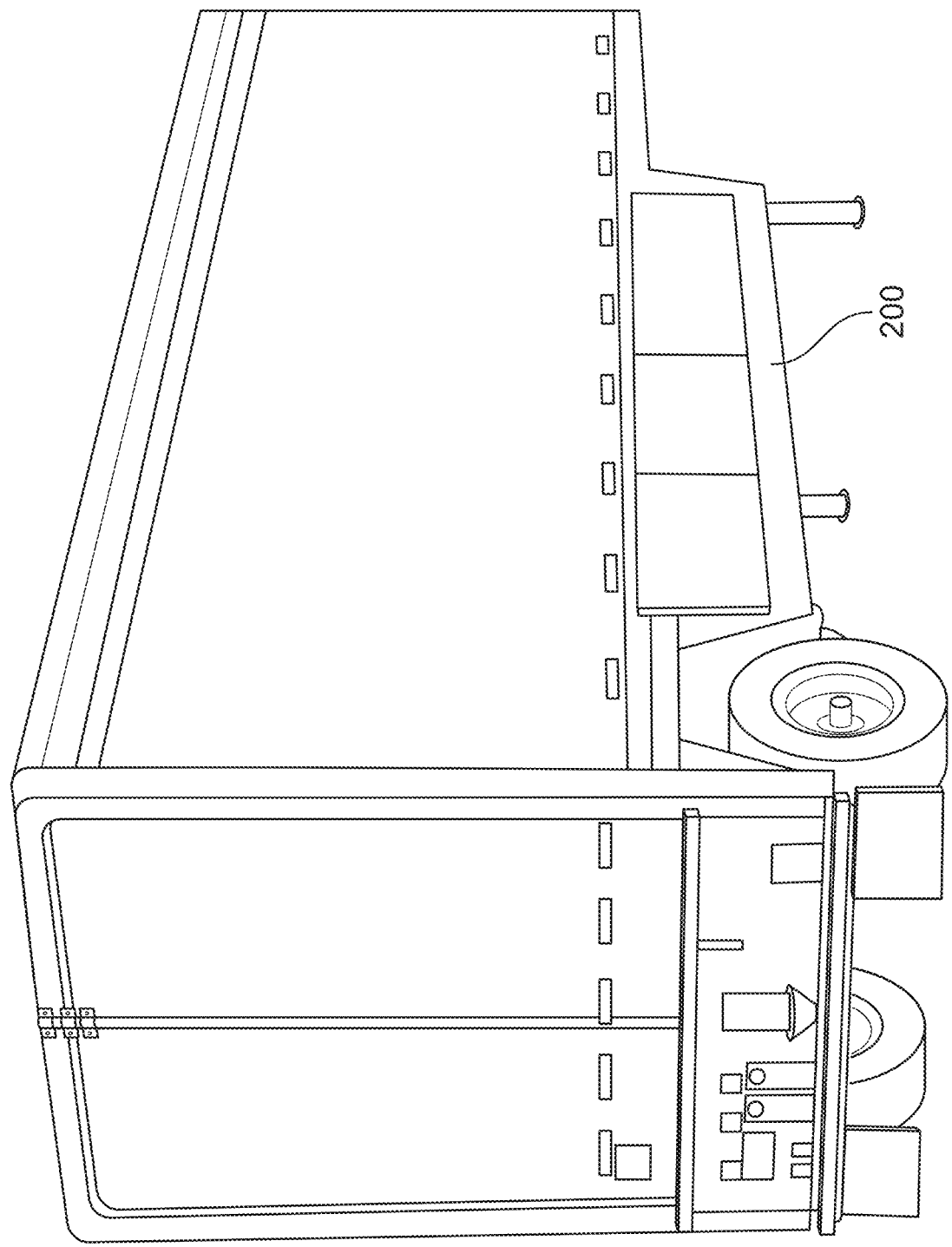

MODULAR TRAILER SYSTEM

CROSS-REFERENCE TO RELATED APPLICATIONS

This application is based on and claims priority to U.S. Provisional Application Ser. No. 62/608,229, filed on Dec. 20, 2017 and titled Modular Trailer System, which is incorporated herein by reference in its entirety.

STATEMENT REGARDING FEDERALLY SPONSORED RESEARCH OR DEVELOPMENT

Not applicable.

STATEMENT REGARDING JOINT RESEARCH AGREEMENT

Not applicable.

BACKGROUND OF THE INVENTION

1. Field of the Invention

The present application relates generally to a modular trailer system and, in particular, to a trailer brake and monitoring system.

2. Description of Related Art

Air operated braking systems have long been utilized to control commercial vehicles such as trucks and trailers, which typically have large gross vehicle weights, in a safe and effective manner. The considerable inertial mass of these heavy-duty vehicles, in combination with the high speeds at which they travel, requires a braking system which responds rapidly with substantial braking power. A spring brake actuator is used in air operated braking systems to provide the force necessary for braking a heavy-duty vehicle.

In a typical spring brake system, braking force may be applied in a number of ways. For normal braking operation, compressed air is introduced into the brake chamber, which co-acts with a diaphragm, such as, for example, an elastomeric diaphragm, and a push rod to apply braking force. For emergency and/or parking brake applications, a power spring stores potential energy and exerts the large force required for braking in case of loss of air pressure or air pressure failure. During normal driving operation, compressed air acts on a diaphragm to compress the power spring to maintain the braking system in a released position. When the compressed air is released, the force of the power spring overcomes the force of the compressed air such that the power spring expands co-acting with the diaphragm and push rod. This in turn, applies a braking force in case of failure of the system air pressure or exhaustion of compressed air while the vehicle is not in operation or is parked.

A loss of compressed air in typical air brake systems means that the power spring applies a braking force to prevent the vehicle from moving. Accordingly, some systems have provided for an emergency/supply pressure line to the braking system such that, in the event of a loss of air pressure on the primary service/control line to the brake system, compressed air will still flow to the brake via an emergency/supply air pressure line. While this configuration will provide a functioning system in the event of catastrophic failure of the service/control line, this system will not provide information to the driver regarding the efficiency of the braking system. For example, the service/control line may suffer from a leaky connection causing substantial leaking of the compressed air. There may be enough air pressure in the system to allow for operation of the vehicle, but the vehicle may suffer from brake drag, meaning the air pressure is not high enough to completely overcome the power spring such that the brake is partially applied during normal driving operation.

Many problems relating to the air supply to both the service and emergency systems occur with prior art systems. For example, with current systems, the emergency/supply line extends to the braking mechanism adjacent to the wheel, and is therefore, subject to damage. If the emergency/supply line becomes damaged, there is no way to determine this if the service/control line continues to function, even if it is only partially functional. Likewise, incorrect connection of supply hoses when a braking system is removed for servicing and re-installed may occur. If, for example, the emergency/supply line is incorrectly re-installed, upon failure of the primary supply line, the braking system will not function. Another air related problem that exists for prior art systems is the provision of service/control air pressure to the trailer when the brakes are not applied. If, for example, there is an air leak from the tractor to the trailer on the service/control pressure line at all times. Still another problem that prior art systems face is the service/control and emergency/supply lines can deliver inadequate pressure due to obstructions or leaks within the air lines. If, for example, moisture in a pressure line freezes and obscures the air pressure line or an air line cracks or gets damaged by road debris.

Another problem that prior art systems face is the provision of stoplight power to the trailer when the brakes are applied. If, for example, the stoplight switch is faulty, stoplight power can be present at the trailer without service/control pressure.

Additional problems with prior art systems include the lack of input data to the brake monitor. For example, prior art systems do not provide wheel speed data on the power line from a faulty Anti-Lock Braking System (ABS) controller. If, for example, the ABS controller has failed or the wheel speed sensors are faulty or have an excessive gap with the exciter ring, then the ABS ECU cannot detect or transmit individual wheel speeds. Similarly, incorrect connection of the 7-conductor electrical connection to the towed vehicle leads to problems in prior art systems. If, for example, the connection is an open circuit, the ABS will not function as well as the stoplights during a braking event.

Still another problem that prior art systems face is incorrect air connections to the dolly that connects two trailers together. Each dolly has one service/control and one emergency/supply pressure line to the lead trailer as well as one service/control and one emergency/supply pressure line to the towed trailer. There are twenty-four different combinations these pressure lines on the dolly can be connected between two trailers with only one combination being correct. Incorrect connection of service/control or emergency/supply hoses will cause a various number of failure conditions. One being no brakes when the service/control line has pressure the other being wheel lockup when the emergency/supply line has no pressure. These failure conditions can be on any one or all wheels of the vehicle. Likewise, another problem that prior art systems face is incorrect connection of supply hoses when a braking system is removed for servicing and re-installed. If, for example, the emergency/supply line is incorrectly re-installed, upon failure of the primary supply line, the braking system will not function. These failure conditions can be on any one or all wheels of the vehicle.

Another problem that prior art systems face is the service/control and emergency/supply line glad-hand shut-off valves at the rear of the trailer. These valves require an open state when towing another vehicle and require a closed state when they are the rear vehicle on a single or multiple trailer combination. Incorrect positioning of the valves will cause the alarm, warning lamp or wireless message and/or signal to be generated. If, for example, the service line glad-hand shut-off valve is shut off to the towed vehicle causing a failure of the service/control line, the service braking system will not function.

As braking systems become more integrated, pneumatic systems are increasingly including electrical components and distribution lines for transmitting power and data. Various electrical components require electrical power to operate correctly including, lamps, electronic circuits, ABS (Anti-lock Braking System) and EBS (Electronic Braking System) to name a few. A loss of electrical power may cause these systems to be non-functional, which would generally be apparent. However, in a situation with reduced or relatively lower power, the systems may not be completely prevented from functioning, but system function and operation may be substantially impaired.

Further, conventional trailer brake control systems do not include a modular design (e.g., allowing the system to be quickly removed and replaced upon failure to keep the vehicle in operation), the ability to handle a 4S ("sensor")/3M ("modulator") configuration with a single trailer control module, a controller area network port allowing the system to transmit data to, and receive data from, other components in a high-speed manner, and a brake monitoring system (e.g., a system that monitors pressure in service and emergency brake pressure lines) that is integrated in a trailer control module with a wheel speed monitoring and ABS control system.

BRIEF SUMMARY OF THE INVENTION

A trailer brake and monitoring system in accordance with one embodiment of the invention described herein includes a trailer control module, which has a processor, a signal input, a first wheel speed input, a second wheel speed input, a valve output, and a data port. The processor receives a signal from the signal input, and the processor sends the signal to the data port. The processor receives a first wheel speed signal from the first wheel speed input and a second wheel speed signal from the second wheel speed input. The processor is configured to send a first brake signal to the valve output based on at least one of the first wheel speed signal and the second wheel speed signal.

The signal input preferably comprises a brake control pressure input and/or a brake supply pressure input. The signal preferably comprises a brake pressure signal. The brake pressure signal may be a brake control pressure signal (e.g., corresponding to the pressure supplied by a brake valve to service brake chambers of brake actuators) and/or a brake supply pressure signal (e.g., corresponding to the pressure supplied by a brake valve via an air reservoir to emergency brake chambers of brake actuators). The processor preferably generates and sends a warning signal to the data port when the brake pressure signal is not within a predefined brake pressure range. The processor preferably generates and sends a first warning signal to the data port when the brake control pressure signal is not within a predefined brake control pressure range, and the processor preferably generates and sends a second warning signal to the data port when the brake supply pressure signal is not within a predefined brake supply pressure range.

The data port is preferably a power input configured for connection with a power line carrier ("PLC") protocol 7-way cable or a controller area network ("CAN") port. Further, the trailer control module may include both a power input for connection with a PLC cable and a CAN port. The power input preferably sends the first and second warning signals to a tractor over a PLC cable. The CAN port is preferably coupled to a communications device and sends the first and second warning signals to the communications device. The communications device may be a telematics unit that wirelessly sends the warning signals to a central server.

The trailer brake and monitoring system is preferably configured for operation in at least a 2S ("sensor")/1M ("modulator" or brake valve) configuration. For operation in a 2S/2M configuration, the trailer control module includes a second valve output, and the processor is configured to send a second brake signal to the second valve output based on at least one of the first wheel speed signal and the second wheel speed signal. For operation in a 4S/2M configuration, the trailer control module further includes a third wheel speed input and a fourth wheel speed input. The processor receives a third wheel speed signal from the third wheel speed input and a fourth wheel speed signal from the fourth wheel speed input. The processor is configured to send a second brake signal to the second valve output based on at least one of the third wheel speed signal and the fourth wheel speed signal. For operation in a 4S/3M configuration, the trailer control module further includes a third valve output. The processor is configured to send a third brake signal to the third valve output based on at least one of the third wheel speed signal and the fourth wheel speed signal. The first, second, and/or third valve outputs are preferably each coupled to a brake valve, such as a full function anti-lock braking system valve, that controls the operation of one or more brake actuators based on the first, second, and/or third brake signals, respectively.

The trailer brake and monitoring system preferably includes a mounting bracket to which the trailer control module and other selected components of the trailer brake and monitoring system are mounted, such as a full function anti-lock braking system ("FFABS") valve, a reservoir purge valve, and a booster valve. The mounting bracket is preferably configured to removably mount at least these selected components of the trailer brake and monitoring system to a trailer (e.g., the mounting bracket may include clamping assemblies for removably mounting it to I-beams of a trailer). In the event of a failure of the trailer brake and monitoring system, it may be replaced with a new trailer brake and monitoring system by removably coupling the mounting bracket of the old trailer brake and monitoring system from engagement with the vehicle to which it is mounted and coupling the mounting bracket of the new trailer brake and monitoring system with the vehicle. The old trailer brake and monitoring system may then be diagnosed and repaired while the vehicle remains operational, which reduces downtime for the vehicle.

The trailer control module can preferably monitor and/or communicate with a tire pressure and temperature management system, trailer roll stability system, foundation brake temperature, door ajar sensing, GPS asset management, stroke sensing, and hub odometer.

The trailer control module preferably has a controller area network (CAN) port that can communicate with (receive data from and send data to) auxiliary components at faster data rates than conventional power line carrier (PLC) protocol connections, which allows the trailer control module to communicate with systems such as a tire pressure management system, a trailer roll stability system, and a communications device/telematics unit with the capability to transmit data wirelessly to a central server.

Some of the various warning signals that may be generated by the processor and transmitted to the driver in the tractor and/or to the central server may include: warning of potential brake drag (e.g., due to low-pressure caused by air leakage); warning of air system leaks in the emergency/supply line; warning of incorrect air line connections and air system false charging of dolly and/or trailer; warning of closed shut-off or restricted valves; incorrect state of trailer glad-hand shut off valves warning; incorrect dolly connection warning; closed brake valve warning; incorrect vehicle static/dynamic condition; tire pressure warning; tire temperature warning; tire inflation warning; brake temperature warning; brake stroke warning; power spring broken warning; door ajar warning; suspension pressure warning; tail fin deployed warning; steer axle detection; reverse detection warning; low reservoir warning; anti dock walk warning; lift axle warning and/or suspension dump warning.

The system may further provide for monitoring of electrical power levels on various electrical lines used, for example, for stop lamps and/or a variety of electrical devices and equipment.

When using the PLC, the system may turn on all ABS warning lamps as necessary; turn on in-cab ABS lamps; turn on an alarm to resolve issues relating to viewing dolly ABS warning lamp; and allows a system status to be broadcast over the PLC.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIGS. 9A-9D show 4S/2M configurations of the trailer brake and monitoring system of FIG. 1 for different types of multi-axle trailer configurations;

FIGS. 10A-10C show 4S/2M configurations of the trailer brake and monitoring system of FIG. 1 for different types of multi-axle trailer with lift axle(s) configurations;

FIGS. 11A-11E show 4S/2M configurations of the trailer brake and monitoring system of FIG. 1 for different types of multi-axle trailer configurations, as recommended for spread axle applications;

FIGS. 12A-12C show 4S/2M configurations of the trailer brake and monitoring system of FIG. 1 for different types of multi-axle trailer with lift axle(s) configurations, as recommended for spread axle applications;

FIGS. 13A-13D show 4S/3M configurations of the trailer brake and monitoring system of FIG. 1 for different types of full and semi-trailer configurations;

FIGS. 14A-14B show a preferred mounting location of the trailer brake and monitoring system of FIG. 1 for a drop deck trailer.

DETAILED DESCRIPTION OF PREFERRED EMBODIMENT

Figure 1:
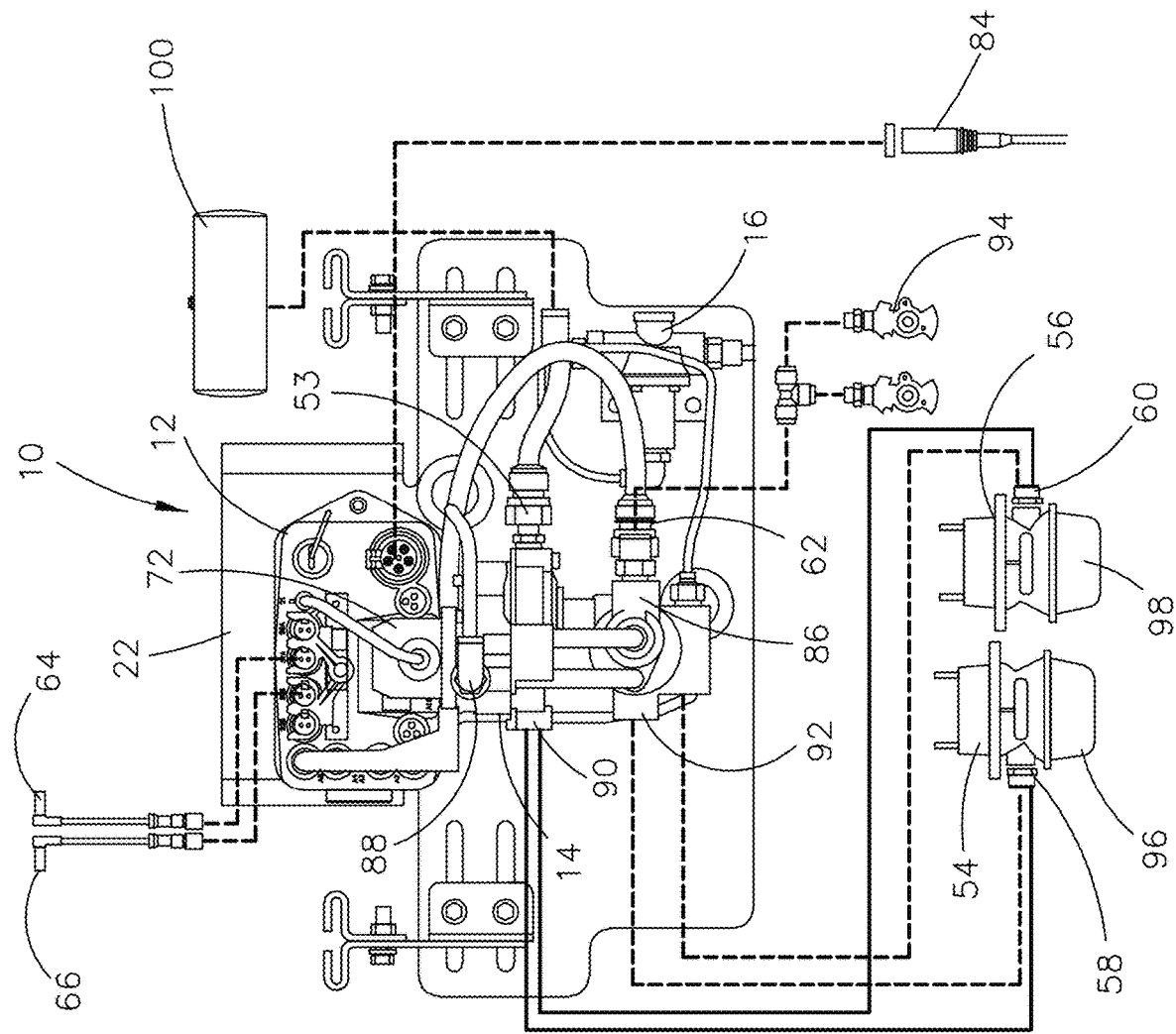
FIG. 1 is a front elevational view showing a trailer brake and monitoring system in accordance with one embodiment of the invention described herein.

A trailer brake and monitoring system in accordance with one embodiment of the invention described herein is identified generally with the reference numeral 10 in FIG. 1. The trailer brake and monitoring system includes a trailer control module 12, a brake valve 14, a reservoir purge valve 16, a booster valve 18 (FIG. 2), a communications device 20 (FIG. 4), and a mounting bracket 22 to which the trailer control module 12, brake valve 14, reservoir purge valve 16, and booster valve 18 are mounted.

Figure 3:
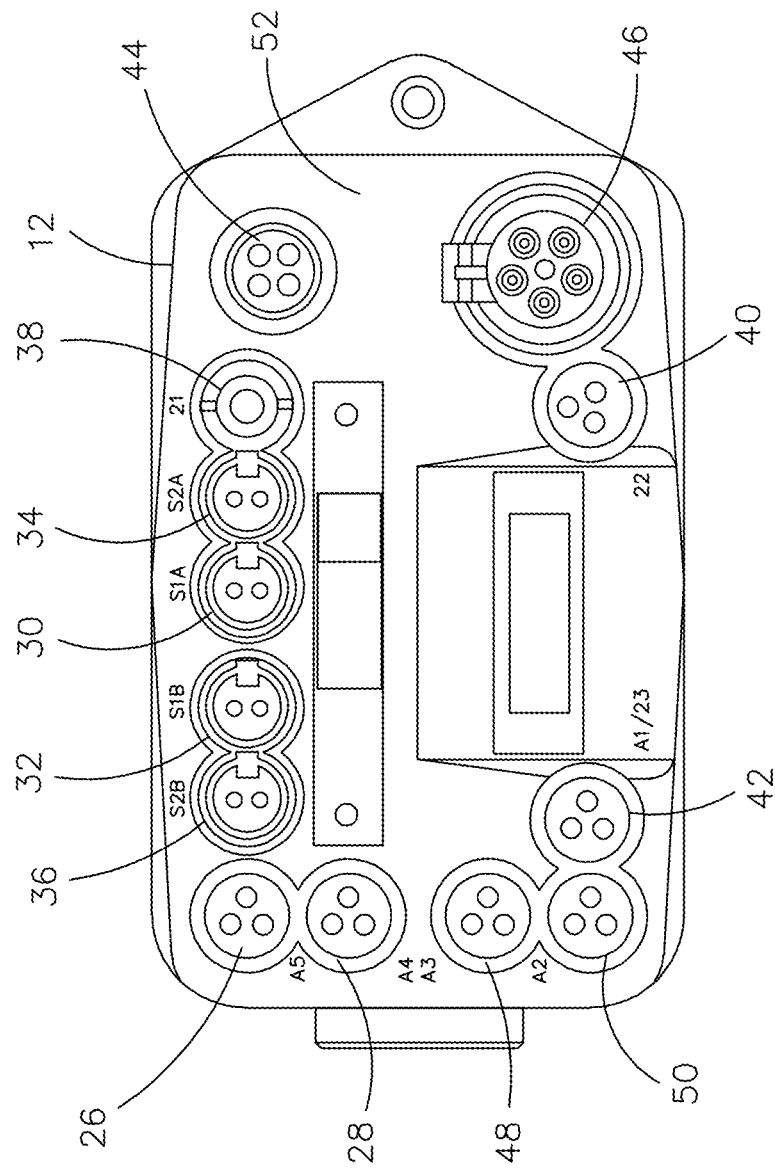
FIG. 3 is a front elevational view of a trailer control module of the trailer brake and monitoring system of FIG. 1.
Figure 6:
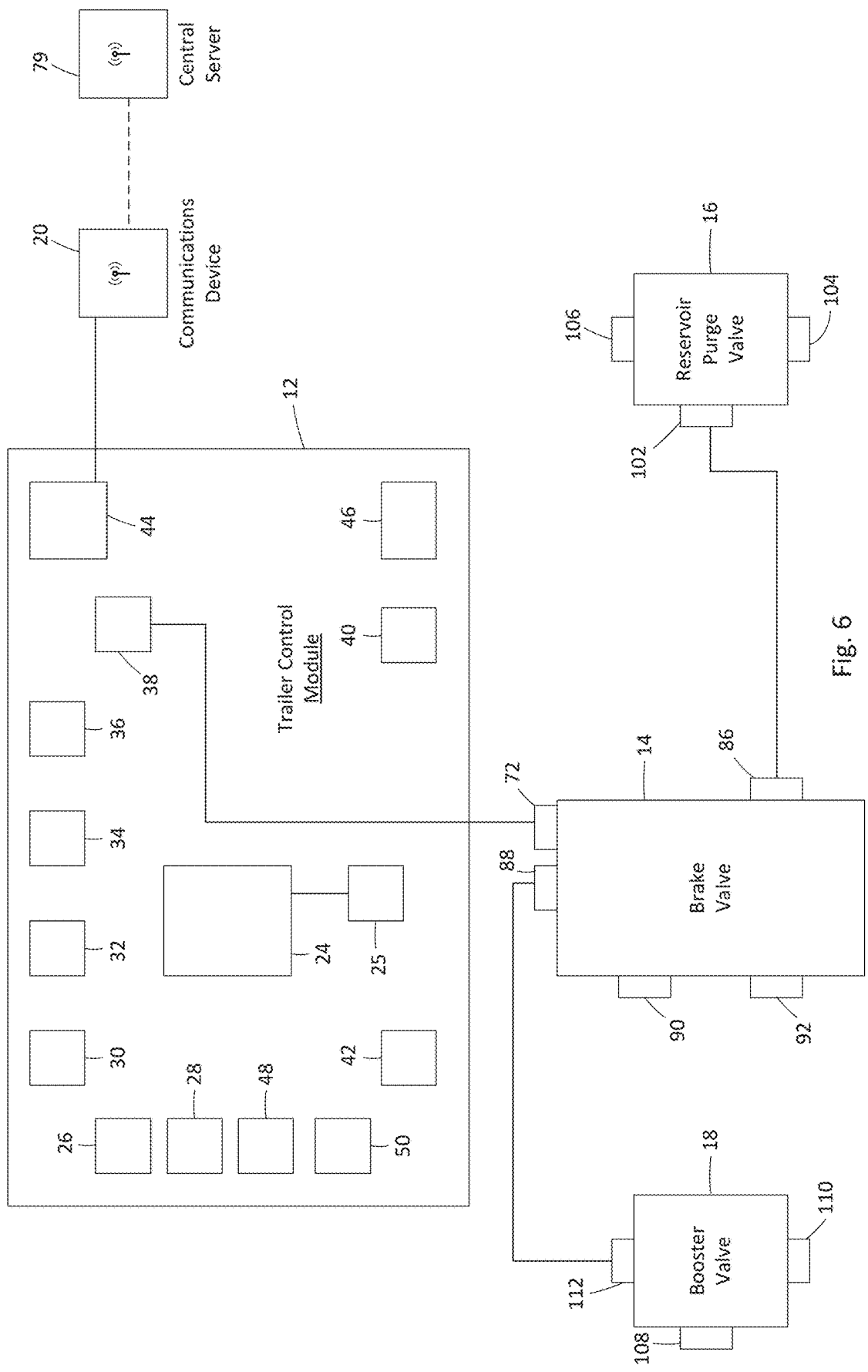
FIG. 6 is a schematic view of the trailer brake and monitoring system of FIG. 1.

Referring to FIG. 6, the trailer control module 12 includes a processor 24 that is electrically coupled with, configured to receive data or instructions from, and configured to transmit data or instructions to: a brake supply pressure input 26, a brake control pressure input 28, a first wheel speed input 30, a second wheel speed input 32, a third wheel speed input 34, a fourth wheel speed input 36, a first valve output 38, a second valve output 40, a third valve output 42, a controller area network ("CAN") port 44, a power input 46, a first auxiliary port 48, and a second auxiliary port 50. Processor 24 may be electrically coupled with memory 25 such as flash upgradable memory storing instructions for processing by processor 24. As shown in FIG. 3, trailer control module 12 includes a housing 52 that contains processor 24. Brake supply pressure input 26, brake control pressure input 28, first wheel speed input 30, second wheel speed input 32, third wheel speed input 34, fourth wheel speed input 36, first valve output 38, second valve output 40, third valve output 42, CAN port 44, power input 46, first auxiliary port 48, and second auxiliary port 50 include external ports configured for releasable coupling with wire connectors to place the ports in electrical communication with external components as described below.

Brake control pressure input 28 is electrically coupled via a wire with a pressure sensor 53 (FIG. 1) that is threadably received by a port in brake valve 14. The pressure sensor 53 is operable to measure a brake control pressure within brake valve 14 and convert the measured brake control pressure into an electrical brake control pressure signal that is transmitted to brake control pressure input 28. The brake control pressure within brake valve 14 corresponds to the pressure supplied by brake valve 14 to service brake chambers 54 and 56 of brake actuators 58 and 60.

Brake supply pressure input 26 is electrically coupled via a wire with a pressure sensor 62 (FIG. 1) that is threadably received by a port in brake valve 14. The pressure sensor 62 is operable to measure a brake supply pressure within brake valve 14 and convert the measured brake supply pressure into an electrical brake supply pressure signal that is transmitted to brake supply pressure input 26. The brake supply pressure within brake valve 14 corresponds to the pressure supplied by brake valve 14 via an air reservoir (preferably located on a tractor and not shown) to emergency brake chambers 96 and 98 of brake actuators 58 and 60.

Figure 4:
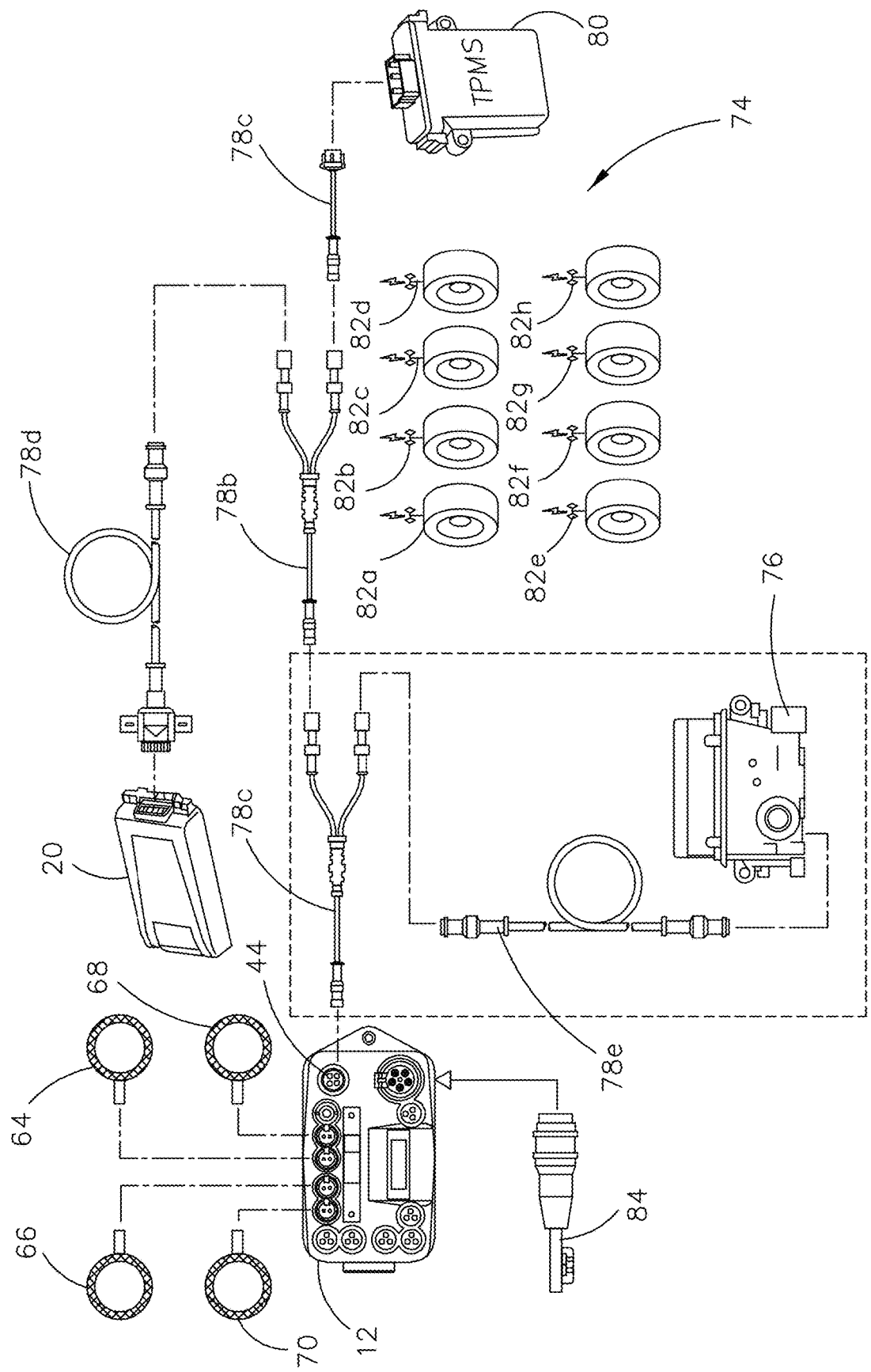
FIG. 4 is a schematic view showing components coupled to certain data ports of the trailer brake and monitoring system of FIG. 1.

First wheel speed input 30, second wheel speed input 32, third wheel speed input 34, and fourth wheel speed input 36 are electrically coupled respectively with a first wheel speed sensor 64, a second wheel speed sensor 66, a third wheel speed sensor 68, and a fourth wheel speed sensor 70, shown in FIG. 4. The first, second, third, and fourth wheel speed sensors 64, 66, 68, and 70 are each operable to detect the frequency of rotation and/or speed of a vehicle wheel and send a corresponding electrical wheel speed signal to the applicable first, second, third, or fourth wheel speed inputs 30, 32, 34, and 36.

First valve output 38 is electrically coupled via a wire with an anti-lock braking system ("ABS") 72 (FIG. 1) of brake valve 14. First valve output 38 is configured to send a brake signal to ABS 72 to control the operation of ABS 72. Second valve output 40 is configured to be electrically coupled with an ABS of a second brake valve 132 (FIGS. 8A-13D), and third valve output 42 is configured to be electrically coupled with an ABS of a third brake valve 134 (FIGS. 13A-13D). Second brake valve 132 and third brake valve 134 preferably have the same or similar configuration as brake valve 14 described herein.

Referring to FIG. 4, controller area network ("CAN") port 44 is electrically coupled to a communications device 20, a tire pressure and temperature monitoring system 74, and a stability module 76 via cables 78*a-e*. CAN port 44 is preferably SAE J1939 and ISO 11898 compatible and meets the CAN 2.0*b* extended frame standard. CAN port 44 operates as a data port that can send data from trailer control module 12 to external devices and receive data from the external devices. Communications device 20 is preferably a telematics unit that is in wireless communication with a central server 79 (FIG. 6). Tire pressure and temperature monitoring system 74 includes a communications module 80 that is in wireless communication with a plurality of tire sensors 82*a-h*. Stability module 76 preferably provides trailer roll over control and automatic braking. CAN port 44 may be electrically coupled to other devices such as a trailer lift axle control device that controls the position of lift axles during operation of a trailer (e.g., Haldex's ILAS® E trailer lift axle control system). CAN port 44 is preferably configured to include at least four separate electrical connections. Two of the electrical connections operate to receive and transmit data using differential signaling. Two of the electrical connections include a 12V power source and ground such that CAN port 44 can be used to power auxiliary components that are connected to the CAN port 44, such as the communications device 20, tire pressure and temperature monitoring system 74, and stability module 76. Processor 24 can preferably shut off power through the 12V power source of the CAN port 44 so that there is sufficient power for trailer control module 12 at critical moments, such as during a potential rollover or jackknife condition. CAN port 44 is preferably operable with diagnostic tools such as Haldex's Infocenter2, Haldex Diagnostics+, and Haldex Fleet+.

Power input 46 is electrically coupled to a cable 84 that provides power to trailer control module 12. Power input 46 is preferably configured for connection with a power line carrier ("PLC") protocol 7-way cable. Power input 46 preferably has the capability to both receive power from an external source for powering trailer control module 12 and act as a data port that sends data from trailer control module 12 to external devices and receives data from the external devices. For example, power input 46 may receive stoplight power (voltage) through PLC cable 84. Power input 46 and PLC cable 84 preferably receive signals and data from, and transmit signals and data to, a tractor to which a trailer having trailer brake and monitoring system 10 is coupled. Power input 46 and PLC cable 84 are preferably operable with diagnostic tools such as Haldex's PLC Infocenter, PLC PC Diagnostics, third party PLC diagnostic tools, and ABS fault lamp blink codes.

First auxiliary port 48 and second auxiliary port 50 are configured to be electrically coupled with auxiliary components such as those to measure tire pressure, tire inflation, tire temperature, brake temperature, brake stroke, the door switch, suspension pressure, tail fin deployment, power spring connection, steer axle lock, reverse detection, low reservoir, anti dock walk, lift axle, suspension dump, trailer roll stability, and hub odometer. First auxiliary port 48 and second auxiliary port 50 are preferably configured so that one of the first and second auxiliary ports 48, 50 is a switched input and the other of first and second auxiliary ports 48, 50 is a 12 Vdc output that is activated in response to a signal received at the switched input. For example, the first and second auxiliary ports 48 and 50 may act as an on/off switch to provide an action determined by pressures, temperature, power voltage and other inputs. First auxiliary port 48 and/or second auxiliary port 50 may control operation of a trailer lift axle control device that controls the position of lift axles during operation of a trailer (e.g., Haldex's ILAS® E trailer lift axle control system).

Brake valve 14 is preferably a full function ABS ("FFABS") valve, such as the Haldex FFABS valve or the valve disclosed in U.S. Pat. No. 5,722,740, which is hereby incorporated by reference herein. Brake valve 14 controls the flow of air to and from the brake actuators 58 and 60. Referring to FIG. 6, brake valve 14 includes a supply pressure inlet 86, a control pressure inlet 88, a service brake pressure outlet 90, and an emergency brake pressure outlet 92. Supply pressure inlet 86 is coupled via a gladhand 94 (FIG. 1) to a source of pressurized air, such as an air reservoir on a tractor to which is connected a trailer containing the trailer brake and monitoring system 10. Control pressure inlet 88 is coupled to booster valve 18, as described in more detail below. Service brake pressure outlet 90 is coupled with the service brake chambers 54 and 56 of brake actuators 58 and 60. Emergency brake pressure outlet 92 is coupled with the emergency brake chambers 96 and 98 of brake actuators 58 and 60. Air entering brake valve 14 through supply pressure inlet 86 is preferably routed in a conventional manner through the brake valve 14 to an air reservoir 100 (FIG. 2) mounted on a trailer and to emergency brake chambers 96 and 98, such as described in U.S. Pat. No. 5,722,740. Brake valve 14 preferably routes air from air reservoir 100 through service brake pressure outlet 90 when pressurized air is supplied to control pressure inlet 88 depending on the condition of ABS 72, as described in U.S. Pat. No. 5,722,740.

Reservoir purge valve 16 is preferably a purge valve, such as the Haldex Reservoir Purge Valve or the valve disclosed in U.S. Patent Application Publication No. 2017/0146137, which is hereby incorporated by reference herein. Reservoir purge valve 16 exhausts air and contaminants from air reservoir 100 when there is a loss of supply pressure at supply pressure inlet 86 (i.e., when the emergency brakes of brake actuators 58 and 60 are actuated). Reservoir purge valve 16 includes a control port 102 that is in fluid communication with the supply pressure inlet 86 of brake valve 14, a reservoir inlet port 104 that is in fluid communication with a port of air reservoir 100, and an exhaust port 106.

Booster valve 18 (FIG. 2) is preferably a booster or relay valve, such as a Haldex Relay Valve. Booster valve 18 has a service brake control inlet 108 that is in fluid communication with a service brake control line of a tractor via a gladhand 109, a supply inlet 110 that is in fluid communication with air reservoir 100, a service brake control outlet 112 that is in fluid communication with the control pressure inlet 88 of brake valve 14, and another service brake control outlet 114 that may be placed in fluid communication with a rear trailer via a gladhand 116. Preferably, when a driver of a tractor depresses a brake pedal, pressurized air from the tractor enters the service brake control inlet 108, which causes air from supply inlet 110 to exit booster valve 18 through service brake control outlet 112 and enter brake valve 14 through control pressure inlet 88.

Communications device 20 (FIG. 4) is preferably a telematics unit. Communications device 20 receives data from CAN port 44 and transmits the data to a central server 79 for storage or processing. Communications device 20 preferably wirelessly transmits the data to central server 79 where it can be stored, processed, and/or transmitted to other locations or devices. Communications device 20 may wirelessly transmit the data over a cellular data connection or a wireless internet connection. Communications device 20 may include a processor with the capability to process data received from CAN port 44.

Figure 2:
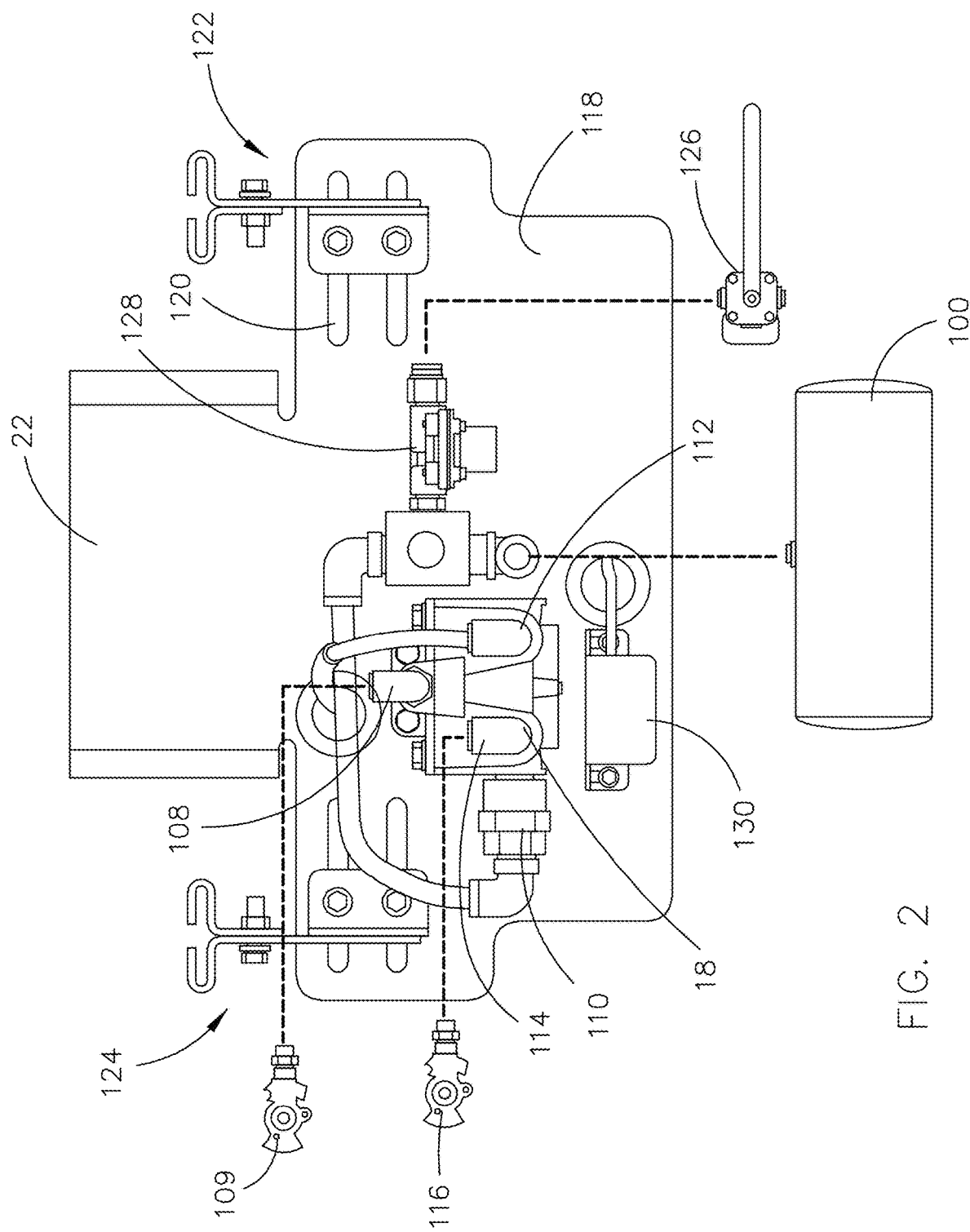
FIG. 2 is a rear elevational view of the trailer brake and monitoring system of FIG. 1.
Figure 14B:
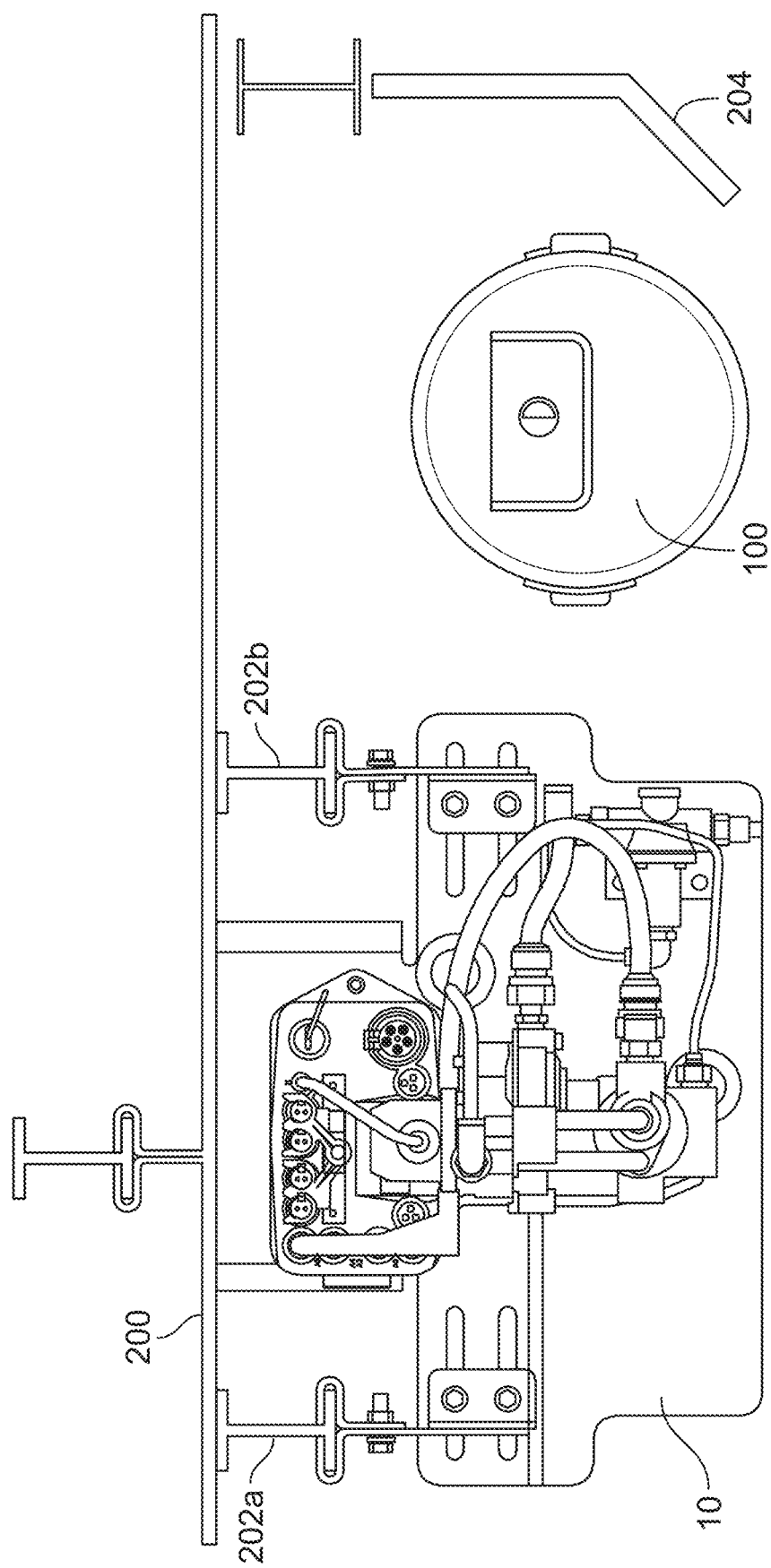

Mounting bracket 22 provides a mounting surface for mounting trailer control module 12, brake valve 14, reservoir purge valve 16, booster valve 18, and alarm 130. Trailer control module 12, brake valve 14, reservoir purge valve 16, booster valve 18, and alarm 130 may be removably or permanently mounted to mounting bracket 22. Referring to FIG. 2, mounting bracket 22 includes a mounting plate 118 to which the trailer control module 12, brake valve 14, reservoir purge valve 16, booster valve 18, and alarm 130 are mounted. Mounting plate 118 includes slots, one of which is identified as 120, that receive fasteners to adjustably mount clamp assemblies 122 and 124 to mounting plate 118. As shown in FIGS. 14A-14B, clamp assemblies 122 and 124 are configured to removably clamp to I-beams 202a and 202b of a trailer 200 for removably coupling mounting bracket 22 to the trailer 200. Mounting bracket 22 may be configured and function as described in U.S. Pat. No. 8,511,929 and/or U.S. Patent Application Publication No. 2011/0236128, each of which are hereby incorporated by reference herein. In the event of a failure of trailer brake and monitoring system 10, it may be replaced with a new trailer brake and monitoring system 10 by removably coupling the mounting bracket 22 of the old trailer brake and monitoring system 10 from engagement with the vehicle to which it is mounted and coupling the mounting bracket 22 of the new trailer brake and monitoring system 10 with the vehicle.

Figure 15A:
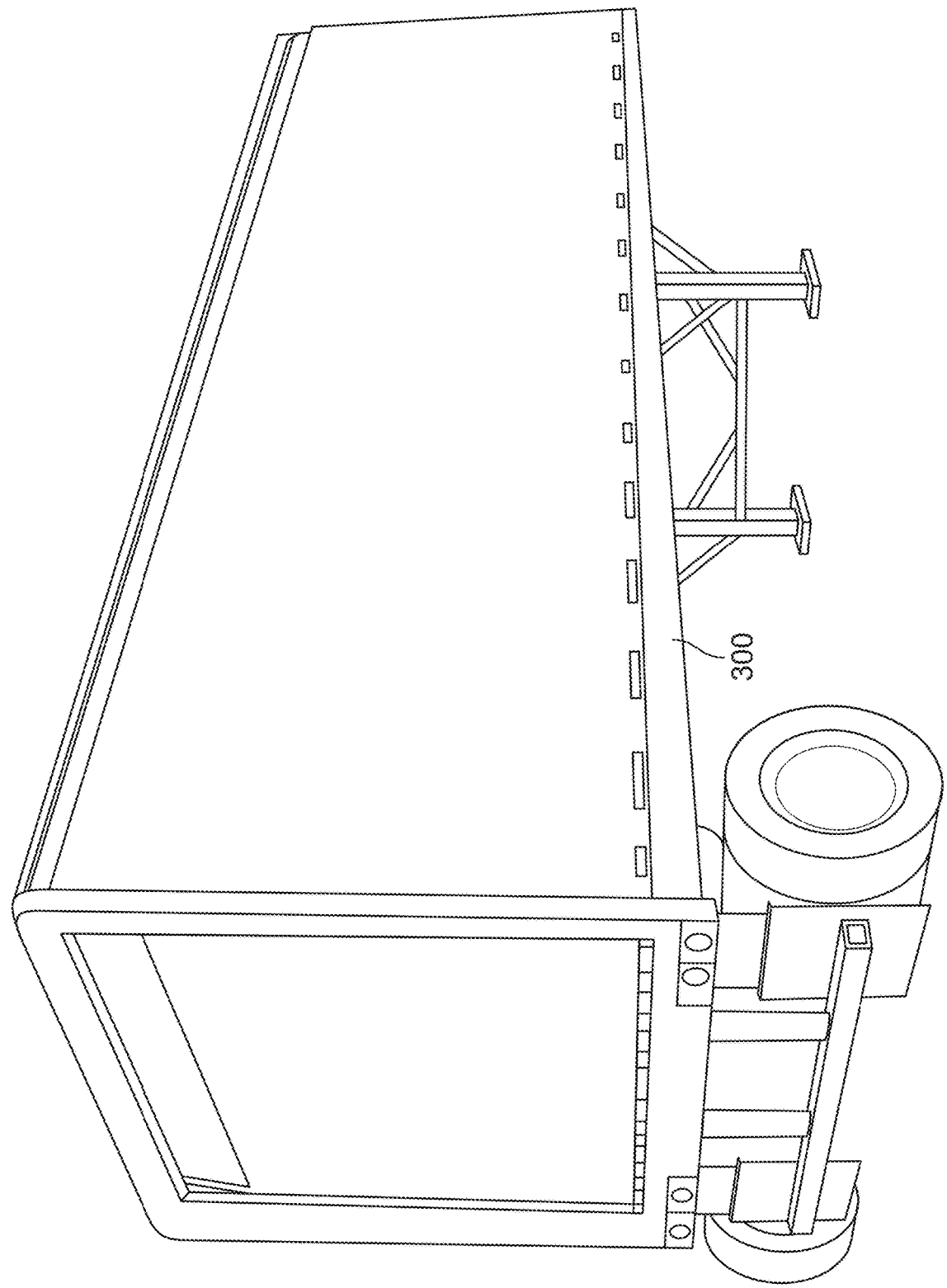
FIGS. 15A-15B show a preferred mounting location of the trailer brake and monitoring system of FIG. 1 for a straight rail trailer.
Figure 15B:
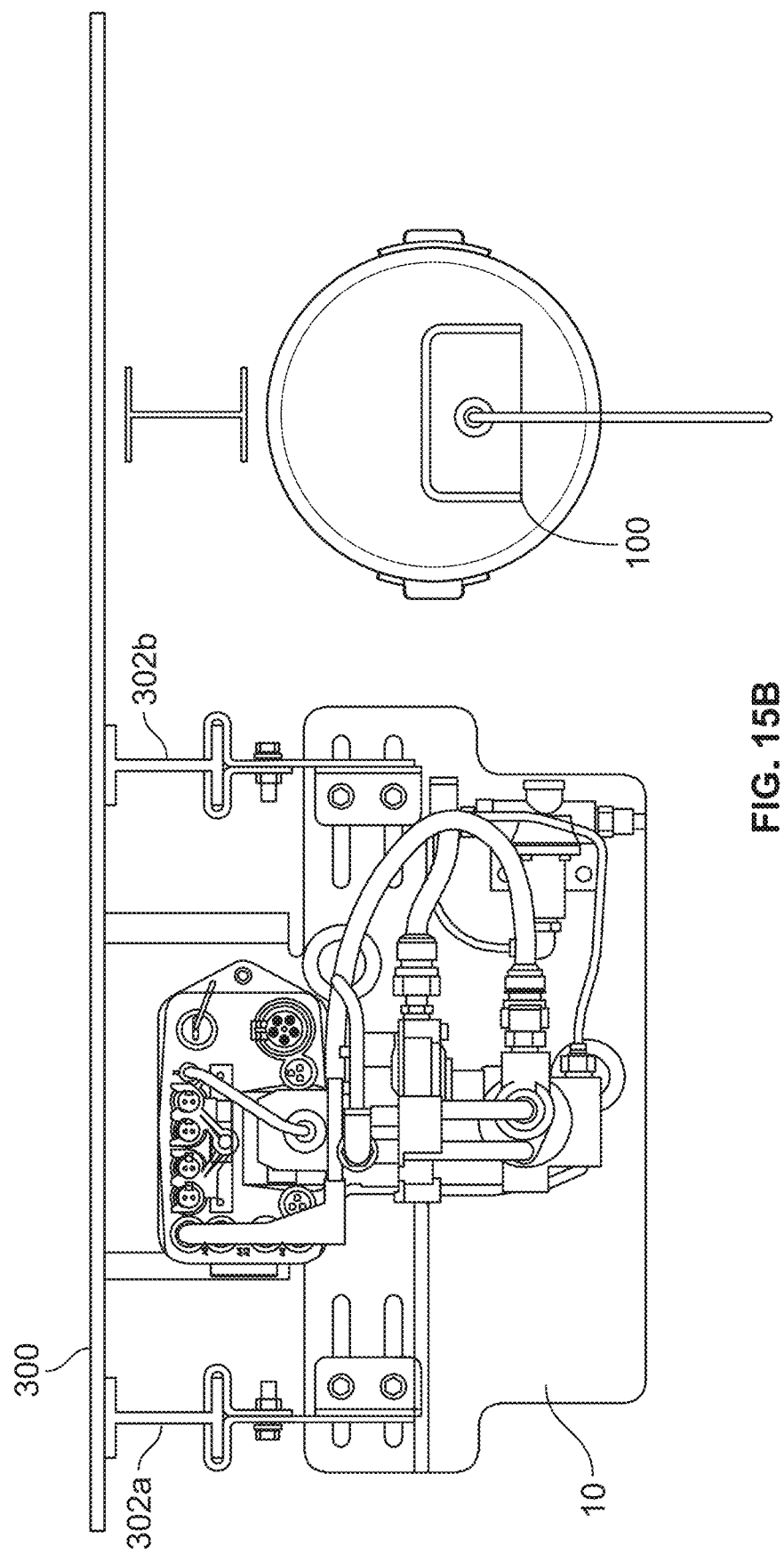

FIGS. 14A-14B show trailer brake and monitoring system 10 mounted to a drop deck trailer 200. In this configuration, trailer brake and monitoring system 10 is preferably positioned behind air reservoir 100, which is positioned behind a protective shield 204 mounted underneath the trailer 200 and extending downward toward the ground. FIGS. 15A-15B show trailer brake and monitoring system 10 mounted to a straight rail trailer 300. Clamp assemblies 122 and 124 removably clamp to I-beams 302a and 302b of trailer 300 for removably coupling mounting bracket 22 to the trailer 300. Trailer brake and monitoring system 10 is positioned behind air reservoir 100.

Figure 5:
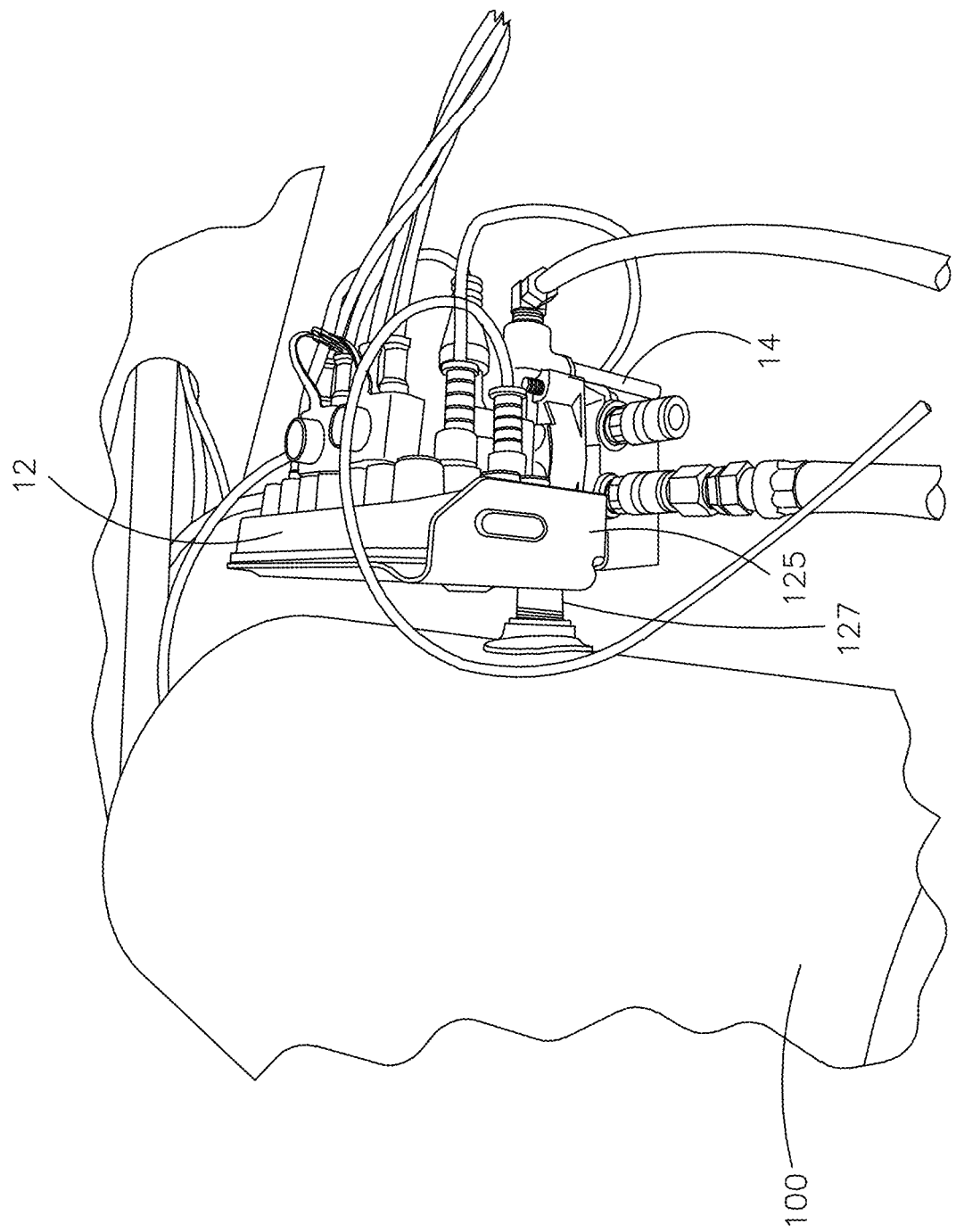
FIG. 5 is a perspective view showing the trailer control module of FIG. 3 mounted to an air reservoir tank.

An optional mounting of trailer control module 12 and brake valve 14 is shown in FIG. 5. Trailer control module 12 is mounted to brake valve 14 with a bracket 125. A threaded air reservoir port 127 of brake valve 14 engages a threaded opening of air reservoir 100 to mount trailer control module 12 and brake valve 14 to air reservoir 100. Air reservoir 100 is mounted to a vehicle in a conventional manner. With this mounting arrangement, reservoir purge valve 16, booster valve 18 and other components of trailer brake and monitoring system 10 may be mounted to the vehicle using mounting bracket 22 or as otherwise known in the art.

A height control valve 126 (FIG. 2) is placed in fluid communication with air reservoir 100 through a pressure protection valve 128. As is generally known in the art, height control valve 126 is mounted to a frame of a vehicle, such as a trailer, and includes a lever that is mounted to a movable suspension component of the vehicle, such as a trailing arm. As the trailing arm moves up, the height control valve 126 introduces air from the air reservoir into an air spring suspension of the vehicle to level the vehicle, and as the trailing arm moves down, the height control valve 126 exhausts air from the air spring suspension. The pressure protection valve 128 blocks the flow of air to height control valve 126 when the air pressure in air reservoir 100 drops below a predetermined level.

Trailer brake and monitoring system 10 also includes an alarm 130 that is electrically coupled via a wire with trailer control module 12. Alarm 130 preferably sounds an audible alarm to warn an operator of a particular condition sensed by trailer control module 12, as described in more detail below.

In operation, processor 24 (FIG. 6) receives a brake control pressure signal from brake control pressure input 28 and a brake supply pressure signal from brake supply pressure input 26. The brake control pressure signal corresponds to the pressure supplied by brake valve 14 to the service brake chambers 54 and 56 (FIG. 1) of brake actuators 58 and 60, and the brake supply pressure signal corresponds to the pressure supplied by brake valve 14 to the emergency brake chambers 96 and 98 of brake actuators 58 and 60.

Processor 24 compares the brake control pressure signal to a predefined brake control pressure range, which may be stored in memory 25 coupled with processor 24. If the brake control pressure signal is not within the predefined brake control pressure range (e.g., the brake control pressure signal indicates that the brake control pressure is too high or too low for the present condition of trailer brake and monitoring system 10), processor 24 generates and sends a first warning signal to CAN port 44 and power input 46. The first warning signal is sent from CAN port 44 to communications device 20, which wirelessly sends the first warning signal to central server 79. Power input 46 may send the first warning signal to a display panel or alarm in the cab of the tractor to notify the driver of a potentially unsafe operating condition. The first warning signal may also be sent to alarm 130 for sounding an audible alarm.

Processor 24 compares the brake supply pressure signal to a predefined brake supply pressure range, which may be stored in memory 25 coupled with processor 24. If the brake supply pressure signal is not within the predefined brake supply pressure range (e.g., the brake supply pressure signal indicates that the brake supply pressure is too high or too low for the present condition of trailer brake and monitoring system 10), processor 24 generates and sends a second warning signal to CAN port 44 and power input 46. The second warning signal is sent from CAN port 44 to communications device 20, which wirelessly sends the second warning signal to central server 79. Power input 46 may send the second warning signal to a display panel or alarm in the cab of the tractor to notify the driver of a potentially unsafe operating condition. The second warning signal may also be sent to alarm 130 for sounding an audible alarm.

Central server 79 preferably stores the occurrence of any first and second warning signals and any corresponding data relating to the brake control pressure signal and/or brake supply pressure signal causing the warning signal. Central server 79 preferably also receives and stores a history over time of the brake control pressure signal and brake supply pressure signal from CAN port 44 and may perform the steps of comparing the brake control pressure signal with a brake control pressure range, comparing the brake supply pressure signal with a brake supply pressure range, generating a first warning signal if the brake control pressure signal is not within the brake control pressure range, and generating a second warning signal if the brake supply pressure signal is not within the brake supply pressure range. Central server 79 preferably sends a notification, such as an e-mail or a text message, to a fleet service operator to notify them of a potential error condition with the vehicle on which trailer brake and monitoring system 10 is installed. The fleet service operator may also have access to the data stored in central server 79 via a web portal or other software that notifies the fleet service operator when a first or second warning signal is generated or received by central server 79.

Processor 24 receives a first wheel speed signal from the first wheel speed input 30, a second wheel speed signal from the second wheel speed input 32, a third wheel speed signal from the third wheel speed input 34, and a fourth wheel speed signal from the fourth wheel speed input 36. Processor 24 is configured to send a first brake signal to the first valve output 38 and to ABS 72 of brake valve 14 based on at least one of the first wheel speed signal and the second wheel speed signal. The first brake signal activates or deactivates ABS 72 based on the first wheel speed signal and/or second wheel speed signal. The brake valve 14 controls braking of at least one of the wheels whose speed is sensed by the first wheel speed sensor 64 and the second wheel speed sensor 66. For example, if the wheel corresponding with first wheel speed input 30 and/or second wheel speed input 32 begins to skid, the first brake signal may activate ABS 72 to stop the wheel(s) from skidding.

Processor 24 is configured to send a second brake signal to second valve output 40 and an ABS of second brake valve 132 (FIGS. 8A-13D) based on at least one of the first wheel speed signal, second wheel speed signal, third wheel speed signal and the fourth wheel speed signal. The second brake signal activates or deactivates the ABS of the second brake valve 132 based on the first wheel speed signal, second wheel speed signal, third wheel speed signal and/or the fourth wheel speed signal. The second brake valve 132 controls braking of at least one of the wheels whose speed is sensed by the third wheel speed sensor 68 and the fourth wheel speed sensor 70.

Processor 24 is configured to send a third brake signal to the third valve output 42 and an ABS of a third brake valve 134 (FIGS. 13A-13D) based on at least one of the third wheel speed signal and the fourth wheel speed signal. The third brake signal activates or deactivates the ABS of the third brake valve 134 based on the third wheel speed signal and/or the fourth wheel speed signal. The third brake valve 134 controls braking of at least one of the wheels whose speed is sensed by the third wheel speed sensor 68 and the fourth wheel speed sensor 70.

FIGS. 7A-13D show exemplary embodiments of configurations of first, second, third, and fourth wheel speed sensors 64, 66, 68, and 70 and of brake valve 14, second brake valve 132, and third brake valve 134 for different types of vehicles and setups.

Figures 7A, 7B, 7C, 7D, 7E:
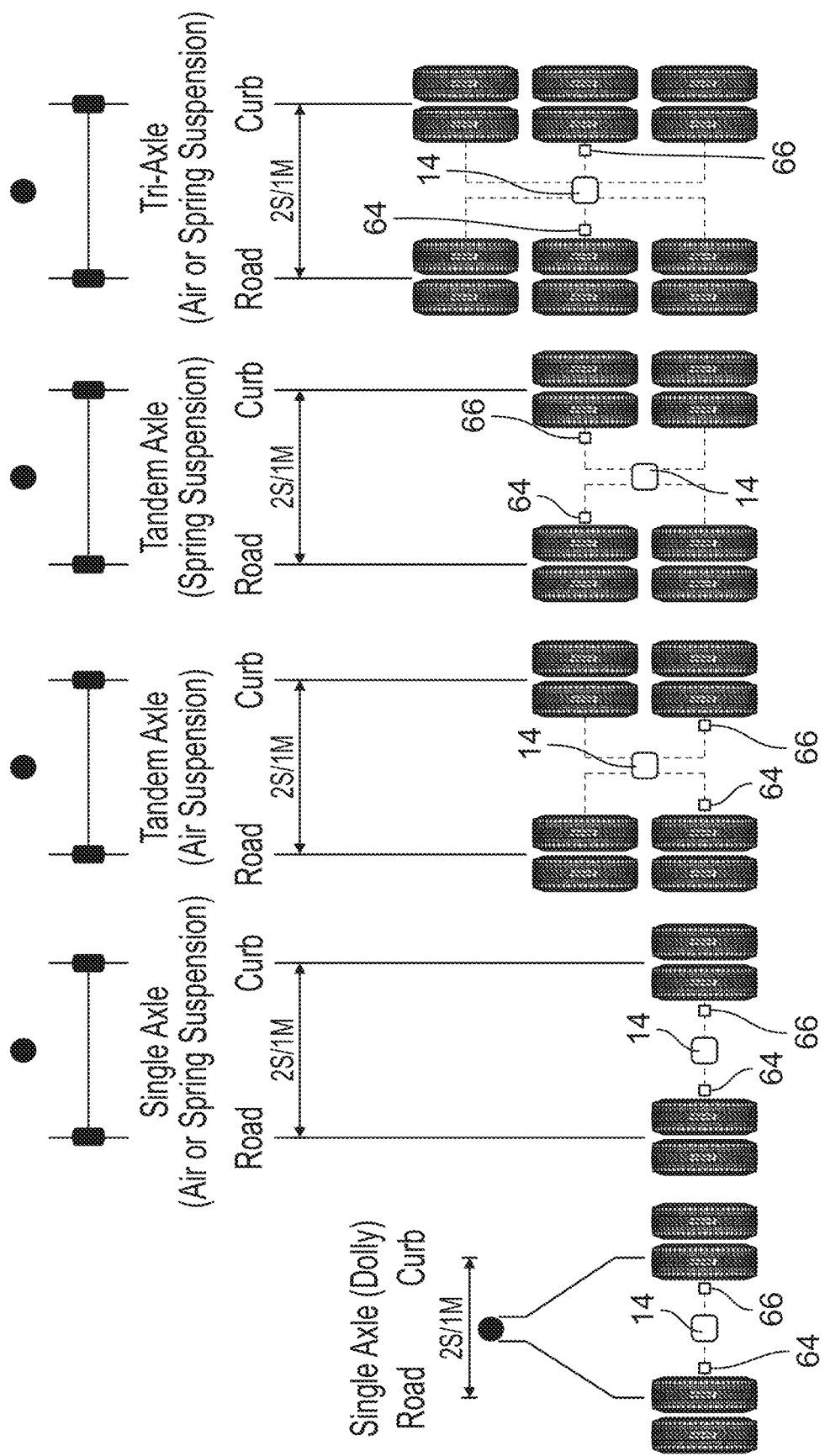
FIGS. 7A-7E show 2S/1M configurations of the trailer brake and monitoring system of FIG. 1 for different types of single or multi-axle trailer configurations.

FIGS. 7A-7E show 2S ("sensor")/1M ("modulator" or brake valve) configurations of trailer brake and monitoring system 10 for five different types of single or multi-axle trailer configurations: a single axle (dolly) (FIG. 7A), a single axle (air or spring suspension) (FIG. 7B), a tandem axle (air suspension) (FIG. 7C), a tandem axle (spring suspension) (FIG. 7D), and a tri-axle (air or spring suspension) (FIG. 7E). Positions of first and second wheel speed sensors 64 and 66 and of brake valve 14 are indicated in FIGS. 7A-7E for the different configurations. In these configurations, third and fourth wheel speed sensors 68 and 70 and second and third valve outputs 40 and 42 are not used. In each configuration shown in FIGS. 7A-7E, the brake valve 14 controls the operation of the braking assemblies on both sides of the vehicle.

Figures 8A, 8B, 8C, 8D:
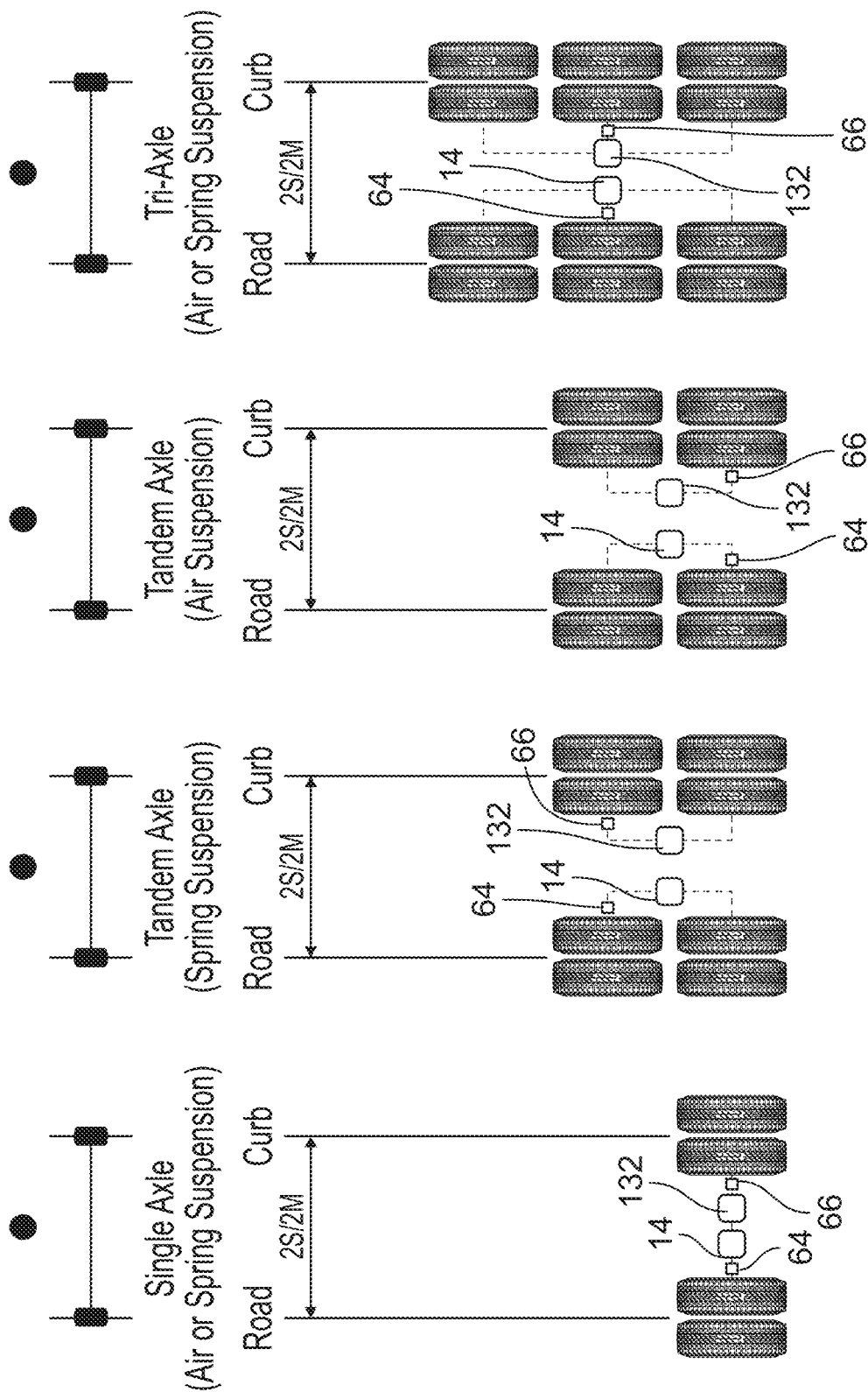
FIGS. 8A-8D show 2S/2M configurations of the trailer brake and monitoring system of FIG. 1 for different types of multi-axle trailer configurations.

FIGS. 8A-8D show 2S/2M configurations of trailer brake and monitoring system 10 for four different types of multi-axle trailer configurations: a single axle (air or spring suspension) (FIG. 8A), a tandem axle (spring suspension) (FIG. 8B), a tandem axle (air suspension) (FIG. 8C), and a tri-axle (air or spring suspension) (FIG. 8D). Positions of first and second wheel speed sensors 64 and 66, of brake valve 14, and of second brake valve 132 are indicated in FIGS. 8A-8D for the different configurations. In these configurations, third and fourth wheel speed sensors 68 and 70 and third valve output 42 are not used. In each configuration shown in FIGS. 8A-8D, the brake valve 14 controls the operation of the braking assemblies on one side of the vehicle, and the second brake valve 132 controls the operation of the braking assemblies on the other side of the vehicle.

FIGS. 9A-9D show 4S/2M configurations of trailer brake and monitoring system 10 for four different types of multi-axle trailer configurations: a tandem axle (air or spring suspension) (FIG. 9A), a tri-axle (air or spring suspension) (FIG. 9B), a quad-axle (air suspension) (FIG. 9C), and a quad-axle (spring suspension) (FIG. 9D). Positions of first, second, third, and fourth wheel speed sensors 64, 66, 68, and 70, of brake valve 14, and of second brake valve 132 are indicated in FIGS. 9A-9D for the different configurations. In these configurations, third valve output 42 is not used. In each configuration shown in FIGS. 9A-9D, the brake valve 14 controls the operation of the braking assemblies on one side of the vehicle, and the second brake valve 132 controls the operation of the braking assemblies on the other side of the vehicle.

FIGS. 10A-10C show 4S/2M configurations of trailer brake and monitoring system 10 for three different types of multi-axle trailer with lift axle(s) configurations: a tandem axle (FIG. 10A), a tri-axle (FIG. 10B), and a quad-axle (FIG. 10C). Positions of first, second, third, and fourth wheel speed sensors 64, 66, 68, and 70, of brake valve 14, and of second brake valve 132 are indicated in FIGS. 10A-10C for the different configurations. In these configurations, third valve output 42 is not used. In each configuration shown in FIGS. 10A-10C, the brake valve 14 controls the operation of the braking assemblies on one side of the vehicle, and the second brake valve 132 controls the operation of the braking assemblies on the other side of the vehicle.

FIGS. 11A-11E show 4S/2M configurations of trailer brake and monitoring system 10 for five different types of multi-axle trailer configurations, as recommended for spread axle applications: a tandem axle (air or spring suspension) (FIG. 11A), a tri-axle (air or spring suspension) (FIG. 11B), a quad-axle (air suspension) (FIG. 11C), a quad-axle (spring suspension) (FIG. 11D), and a full trailer (air or spring suspension) (FIG. 11E). Positions of first, second, third, and fourth wheel speed sensors 64, 66, 68, and 70, of brake valve 14, and of second brake valve 132 are indicated in FIGS. 11A-11E for the different configurations. In these configurations, third valve output 42 is not used. In each configuration shown in FIGS. 11A-11E, the brake valve 14 controls the operation of the braking assemblies for one or more axles on both sides of the vehicle, and the second brake valve 132 controls the operation of the braking assemblies for one or more axles on both sides of the vehicle.

FIGS. 12A-12C show 4S/2M configurations of trailer brake and monitoring system 10 for three different types of multi-axle trailer with lift axle(s) configurations, as recommended for spread axle applications: a tandem axle (FIG. 12A), a tri-axle (FIG. 12B), and a quad-axle (FIG. 12C). Positions of first, second, third, and fourth wheel speed sensors 64, 66, 68, and 70, of brake valve 14, and of second brake valve 132 are indicated in FIGS. 12A-12C for the different configurations. In these configurations, third valve output 42 is not used. In each configuration shown in FIGS. 12A-12C, the brake valve 14 controls the operation of the braking assemblies for one or more axles on both sides of the vehicle, and the second brake valve 132 controls the operation of the braking assemblies for one or more axles on both sides of the vehicle.

FIGS. 13A-13D shows 4S/3M configurations of trailer brake and monitoring system 10 for four different types of full and semi-trailer configurations: a full trailer (air suspension) (FIG. 13A), a full trailer (air or spring suspension) (FIG. 13B), a semi-trailer tandem axle (air or spring suspension) (FIG. 13C), and a semi-trailer tri-axle (air suspension) (FIG. 13D). Positions of first, second, third, and fourth wheel speed sensors 64, 66, 68, and 70, of brake valve 14, of second brake valve 132, and of third brake valve 134 are indicated in FIGS. 13A-13D for the different configurations. In each configuration shown in FIGS. 13A-13D, the brake valve 14 controls the operation of certain braking assemblies on one side of the vehicle, the second brake valve 132 controls the operation of certain braking assemblies on the other side of the vehicle, and the third brake valve 134 controls the operation of braking assemblies for an axle on both sides of the vehicle.

Referring to FIG. 6, processor 24 may monitor stoplight power (voltage) provided to power input 46 through PLC cable 84 and compare that measured value to the brake control pressure signal from brake control pressure input 28. If the actual measured value differs from or exceeds a maximum allowable deviation (for example, if the brake control pressure signal indicates that the service brakes of the vehicle are being applied but the stoplight power voltage indicates that power is not being supplied to the brake lights), processor 24 may generate and send a warning signal to CAN port 44, power input 46, and alarm 130 in a similar manner as described above with respect to the first and second warning signals.

Processor 24 may receive data through CAN port 44, power input 46, and/or first and second auxiliary ports 48 and 50 corresponding to: tire pressure, tire inflation, tire temperature, brake temperature, brake stroke, the door switch, suspension pressure, tail fin deployment, power spring connection, steer axle lock, reverse detection, low reservoir, anti dock walk, lift axle, suspension dump, trailer roll stability, and hub odometer. Processor 24 may compare the data to a predefined set-point or ranges for such data and/or to other data received by processor 24 to determine if an error condition exists. If an error condition exists, processor 24 may generate and send a warning signal to CAN port 44, power input 46, and alarm 130 in a similar manner as described above with respect to the first and second warning signals. Further, the warning signal may be transmitted to communications device 20 and central server 79, as described above. Exemplary types of warning signals that may be generated by processor 24 are described below.

Processor 24 may generate a brake drag warning signal in the event that a low-pressure situation is detected (e.g., a known pressure range may allow a brake system to still function but will be known to cause brake drag) within a range of pressures. It is contemplated that a brake drag warning signal may be transmitted to a user/driver in the cab of the tractor-trailer through power input 46 and PLC cable 84 or may also be transmitted to central server 79 through CAN port 44.

Additional warning signals that may be generated by processor 24 include an incorrect connection warning signal, a closed service/control valve warning signal, a closed emergency/supply warning signal, no stoplight power warning signal, and an ABS warning signal. As the brake system is serviced and/or repaired, it is possible to reconnect the various pressure lines incorrectly. By measuring the brake control pressure and brake supply pressure, processor 24 is able to determine if a pressure line(s) is incorrectly connected to the brake valve 14. It is further contemplated that the position of the brake valve 14 may be measured and this data and/or information may be transmitted to processor 24 through first valve output 38 such that a warning or alarm may be generated in the event the brake valve 14 fails to actuate as designed. All of these indications may be generated/transmitted as described above.

Additional parameters that may be monitored by processor 24 and that may form the basis for a warning signal or indication include: tire pressure, tire inflation, tire temperature, brake temperature, brake stroke, door (ajar), suspension pressure, tail fin deployment, power spring condition, steer axle lock, reverse detection, low reservoir, anti dock walk, lift axle and suspension dump. The indication may be provided as an alarm, a warning lamp, a wireless message, a signal, or any combination thereof.

Failure of one or more tires on a tractor-trailer can be very dangerous. This is complicated by the fact that a tire may catastrophically fail with little or no warning or a tire may fail (e.g. on the trailer) and the operator does not become aware of the failure until much later. The tire pressure, tire inflation and tire temperature are all indications to the operator providing data relating to the status of the tires on the tractor-trailer allowing the operator to take quick action in the event of a failure. The information can also allow the operator to address any problems with the tires relatively early so as to avoid catastrophic failure on the road. The devices used to measure the above parameters may comprise any of the standard measurement devices.

The brake temperature and brake stroke are indications that provide warnings if the temperature of the brakes rises above a threshold level or if the measured stroke of the brake indicates excessive wear. The safe operation of the braking system in a tractor-trailer is critical. In the event that the braking system gets too hot, an indication may be generated so that the braking system can be inspected and/or serviced as necessary to ensure proper functionality. The brake stroke indication can be generated by a linear location measurement that can provide a service needed alert.

The door (ajar) indication may comprise, for example, a switch that indicates whether the door on the trailer is fully closed or not. It is understood that the switch may be programmable as either a normally closed or normally open switch.

The suspension pressure indication relates to a pressure measurement to ensure that the air pressure in the suspension system does not exceed a defined threshold. This threshold can be either a high limit or a low limit or both. The measurement device could comprise any of a transducer, a pressure switch or a sensor.

Tail fin deployment may comprise an indication generated by a switch as described in connection with the door (ajar) indication. This would alert the operator that the tail fin was in a deployed position so that it could be retracted properly prior to operating the vehicle.

With respect to the power spring condition indication, fractures or catastrophic failure of the power spring due to, for example, corrosion or wearing of the device can be very dangerous. To avoid this, a measurement that indicates that the power spring may be damaged or wearing can be obtained by a linear location measurement or measuring a "home" location for the power spring. If the power spring begins to wear, the power spring will not return to the original or "home" location that it originally started from when installed. Alternatively, the measurement could comprise a continuity measurement.

The steer axle lock is a function that locks the steering axle once the vehicle reaches a certain speed. At relatively low speed, the steer axle functionality provides the operator of the vehicle with greater maneuverability; however, such functionality is not safe at higher speeds. Accordingly, the steering axle may automatically lock at a desired vehicle speed, which may be fully programmable. The indication provides the monitoring device with information that the lock has engaged.

The reverse detection indication can be used to actuate various devices on the trailer such as a back-up alarm (audible sound) or reverse lights, etc. The measurement device providing the indication may in one embodiment comprise a Hall Effect switch.

It is important to receive information relating to the pressure in the primary air reservoir that provides pressurized air to the suspension system and the air brake system. A low reservoir indication may be generated by pressure measurement that may comprise any known type of pressure sensor or switch.

An anti dock walk indication provides a warning to the operator that the anti dock walk system is engaged and must be disengaged prior to operation of the vehicle.

The lift axle provides the operator with an indication that the lift axle should be in the down position. The axle in a tractor-trailer may set in either an up or down position, however, when the trailer is loaded the axle should be set in the down position. This indication will alert the operator to lower the axle if the weight of the trailer exceeds a threshold value. This threshold may be completely programmable.

The suspension dump provides an indication that the air in the suspension system has been rapidly exhausted from the air bags. Due to the fact that the axles of the tractor-trailer are relatively far apart (variable based on the length of the vehicle), when the vehicle makes a sharp turn the tires on the trailer axles have a tendency to be dragged sideways rather than rolling forward. This dragging severely wears the tires leading to premature failure. However, if the air in the suspension system is dumped in one of the axles (e.g., the forward axle of the two rear axles on the trailer), this allows for less wearing of the tires.

All or some of the data may be transmitted as data to central server 79 where historical data may be accumulated for each vehicle. In this manner, trends may be followed and maintenance could be anticipated/scheduled according to the vehicle's historical data prior to failure of device(s) and/or system(s). It is also contemplated that control for a backup alarm may be provided such that a backup indicated is generated and transmitted. In one embodiment, different transmission paths for the indication and backup indication may be used to ensure delivery of the indication. The system could utilize two wired transmission paths, or wireless transmission, or power line connection as desired to ensure reliable transmission. It is understood that the transmission method can be selected based on the application.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A trailer brake and monitoring system comprising:
   a trailer control module comprising a processor, a brake control pressure input, a brake supply pressure input, a first wheel speed input, a second wheel speed input, a third wheel speed input, a fourth wheel speed input, a first valve output, a second valve output, and a controller area network port, wherein the trailer control module is configured for mounting on a trailer,
   wherein the processor is configured to receive a brake control pressure signal from the brake control pressure input and a brake supply pressure signal from the brake supply pressure input, wherein the processor is configured to generate and send a first warning signal to the controller area network port when the brake control pressure signal is not within a predefined brake control pressure range, and wherein the processor is configured to generate and send a second warning signal to the controller area network port when the brake supply pressure signal is not within a predefined brake supply pressure range,
   wherein the processor is configured to receive a first wheel speed signal from the first wheel speed input and a second wheel speed signal from the second wheel speed input, wherein the processor is configured to send a first brake signal to the first valve output based on at least one of the first wheel speed signal and the second wheel speed signal, the first and second wheel speed signals corresponding to first and second wheels, respectively, of the trailer,
wherein the processor is configured to receive a third wheel speed signal from the third wheel speed input and a fourth wheel speed signal from the fourth wheel speed input, and wherein the processor is configured to send a second brake signal to the second valve output based on at least one of the third wheel speed signal and the fourth wheel speed signal, the third and fourth wheel speed signals corresponding to third and fourth wheels, respectively, of the trailer.

2. The system of claim 1, wherein the trailer control module further comprises a third valve output, and wherein the processor is configured to send a third brake signal to the third valve output based on at least one of the third wheel speed signal and the fourth wheel speed signal.

3. The system of claim 1, wherein the trailer control module further comprises a power input with a data port.

4. The system of claim 1, further comprising a communications device coupled to the controller area network port, wherein the communications device receives the first warning signal and the second warning signal, and wherein the communications device wirelessly sends the first warning signal and the second warning signal to a central server.

5. The system of claim 1, further comprising a mounting bracket to which the trailer control module is mounted.

6. The system of claim 5, further comprising a brake valve that is mounted to the mounting bracket, wherein the brake valve is coupled to the first valve output, and wherein the brake valve comprises a supply pressure inlet, an emergency brake pressure outlet, a control pressure inlet, and a service brake pressure outlet.

7. The system of claim 6, further comprising a reservoir purge valve that is mounted to the mounting bracket, wherein the reservoir purge valve comprises a reservoir inlet port, an exhaust port, and a control port that is coupled to the supply pressure inlet of the brake valve.

8. The system of claim 7, further comprising a booster valve that is mounted to the mounting bracket, wherein the booster valve comprises a service brake control inlet, a service brake control outlet that is coupled to the control pressure inlet of the brake valve, and a supply inlet.

9. A trailer brake and monitoring system comprising:
a trailer control module comprising a processor, a signal input, a first wheel speed input, a second wheel speed input, a valve output, and a controller area network port, wherein the trailer control module is configured for mounting on a trailer,
wherein the processor is configured to receive a signal from the signal input, wherein the processor is configured to send Sends the signal to the controller area network port,
wherein the processor is configured to receive a first wheel speed signal from the first wheel speed input and a second wheel speed signal from the second wheel speed input, and wherein the processor is configured to send a first brake signal to the valve output based on at least one of the first wheel speed signal and the second wheel speed signal, the first and second wheel speed signals corresponding to first and second wheels, respectively, of the trailer.

10. The system of claim 9, further comprising a communications device that is coupled to the controller area network port, wherein the communications device receives the signal, and wherein the communications device wirelessly sends the signal to a central server.

11. The system of claim 9, wherein the trailer control module further comprises a power input comprising a data port.

12. The system of claim 9, wherein the signal input comprises at least one of a brake control pressure input and a brake supply pressure input, wherein the signal comprises a brake pressure signal, and wherein the processor is configured to generate and send a warning signal to the controller area network port when the brake pressure signal is not within a predefined brake pressure range.

13. The system of claim 9, wherein the trailer control module further comprises a third wheel speed input, a fourth wheel speed input, and a second valve output, wherein the processor is configured to receive a third wheel speed signal from the third wheel speed input and a fourth wheel speed signal from the fourth wheel speed input, and wherein the processor is configured to send a second brake signal to the second valve output based on at least one of the third wheel speed signal and the fourth wheel speed signal.

14. The system of claim 9, further comprising a mounting bracket to which the trailer control module is mounted.

15. The system of claim 14, further comprising a brake valve that is mounted to the mounting bracket, wherein the brake valve is coupled to the valve output, and wherein the brake valve comprises a supply pressure inlet, an emergency brake pressure outlet, a control pressure inlet, and a service brake pressure outlet.

16. The system of claim 15, further comprising a reservoir purge valve that is mounted to the mounting bracket, wherein the reservoir purge valve comprises a reservoir inlet port, an exhaust port, and a control port that is coupled to the supply pressure inlet of the brake valve.

17. The system of claim 16, further comprising a booster valve that is mounted to the mounting bracket, wherein the booster valve comprises a service brake control inlet, a service brake control outlet that is coupled to the control pressure inlet of the brake valve, and a supply inlet.

18. A trailer brake and monitoring system comprising:
a trailer control module comprising a processor, a brake control pressure input, a brake supply pressure input, a first wheel speed input, a second wheel speed input, a third wheel speed input, a fourth wheel speed input, a first valve output, a second valve output, a controller area network port, and a power input with a data port, wherein the trailer control module is configured for mounting on a trailer,
wherein the processor is configured to receive a brake control pressure signal from the brake control pressure input and a brake supply pressure signal from the brake supply pressure input, wherein the processor is configured to generate and send a first warning signal to the controller area network port and the data port when the brake control pressure signal is not within a predefined brake control pressure range, and wherein the processor is configured to generate and send a second warning signal to the controller area network port and the data port when the brake supply pressure signal is not within a predefined brake supply pressure range,
wherein the processor is configured to receive a first wheel speed signal from the first wheel speed input and a second wheel speed signal from the second wheel speed input, wherein the processor is configured to send a first brake signal to the first valve output based on at least one of the first wheel speed signal and the second wheel speed signal, the first and second wheel speed signals corresponding to first and second wheels, respectively, of the trailer, wherein the processor is configured to receive a third wheel speed signal from the third wheel speed input and a fourth wheel speed signal from the fourth wheel speed input, and wherein the processor is configured to send a second brake signal to the second valve output based on at least one of the third wheel speed signal and the fourth wheel speed signal, the third and fourth wheel speed signals corresponding to third and fourth wheels, respectively, of the trailer; and a communications device coupled to the controller area network port, wherein the communications device is configured to receive the first warning signal and the second warning signal, and wherein the communications device is configured to wirelessly send the first warning signal and the second warning signal to a central server.

19. The system of claim 18, further comprising a mounting bracket to which the trailer control module is mounted.

20. The system of claim 19, further comprising a brake valve that is mounted to the mounting bracket, wherein the brake valve is coupled to the first valve output, and wherein the brake valve comprises a supply pressure inlet, an emergency brake pressure outlet, a control pressure inlet, and a service brake pressure outlet.

21. The system of claim 20, further comprising a reservoir purge valve that is mounted to the mounting bracket, wherein the reservoir purge valve comprises a reservoir inlet port, an exhaust port, and a control port that is coupled to the supply pressure inlet of the brake valve.

22. The system of claim 21, further comprising a booster valve that is mounted to the mounting bracket, wherein the booster valve comprises a service brake control inlet, a service brake control outlet that is coupled to the control pressure inlet of the brake valve, and a supply inlet.

* * * * *

UNITED STATES PATENT AND TRADEMARK OFFICE
CERTIFICATE OF CORRECTION

PATENT NO. : 10,946,842 B2  
APPLICATION NO. : 16/224961  
DATED : March 16, 2021  
INVENTOR(S) : Justin Williams Page 1 of 1

It is certified that error appears in the above-identified patent and that said Letters Patent is hereby corrected as shown below:

In the Claims

Column 17  
Line 54, delete "Sends" between "send" and "the".

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*